(12) United States Patent
Cherfane et al.

(10) Patent No.: US 6,704,617 B2
(45) Date of Patent: Mar. 9, 2004

(54) AUTOMATED SYSTEM FOR CONTROL AND DIAGNOSTICS FOR DISPENSING SYSTEMS

(75) Inventors: Raymond Cherfane, Acworth, GA (US); Edward Cocciadiferro, Fletcher, NC (US)

(73) Assignee: Flexible Products Company, Marietta, GA (US)

( * ) Notice: Subject to any disclaimer, the term of this patent is extended or adjusted under 35 U.S.C. 154(b) by 86 days.

(21) Appl. No.: 10/120,915

(22) Filed: Apr. 11, 2002

(65) Prior Publication Data

US 2003/0195651 A1 Oct. 16, 2003

(51) Int. Cl.$^7$ .............................................. G06F 17/00
(52) U.S. Cl. ................... 700/239; 700/244; 700/265; 222/52; 222/638; 222/639; 137/3; 137/4; 137/88
(58) Field of Search ................................. 700/231, 233, 700/239, 241, 244, 265; 222/52, 638, 639; 137/3, 4, 88, 93, 607

(56) References Cited

U.S. PATENT DOCUMENTS

| | | |
|---|---|---|
| 3,236,419 A | 2/1966 | Remer et al. |
| 3,239,100 A | 3/1966 | Peterson |
| 3,908,862 A | 9/1975 | Chandra et al. |
| 4,008,829 A | 2/1977 | Chandra et al. |
| 4,154,368 A | 5/1979 | Gusmer et al. |
| 4,275,822 A | 6/1981 | Juffa et al. |
| 4,285,446 A * | 8/1981 | Rapp et al. .................. 222/639 |
| 4,719,574 A | 1/1988 | Duback et al. |
| 4,766,548 A | 8/1988 | Cedrone et al. |
| 4,865,226 A | 9/1989 | Becker et al. |
| 4,938,381 A | 7/1990 | Mandeville et al. |
| 5,050,776 A | 9/1991 | Rosenplanter |
| 5,056,017 A | 10/1991 | McGarvey |
| 5,082,142 A | 1/1992 | Saidman et al. |
| 5,153,825 A | 10/1992 | Yauk et al. |
| 5,271,521 A | 12/1993 | Noss et al. |
| 5,282,127 A | 1/1994 | Mii |
| 5,289,372 A | 2/1994 | Guthrie et al. |
| 5,332,125 A | 7/1994 | Schmitkons et al. |
| 5,531,357 A | 7/1996 | Guilmette |
| 5,533,648 A | 7/1996 | Read et al. |
| 5,590,816 A | 1/1997 | Bertram et al. |
| 5,608,643 A | 3/1997 | Wichter et al. |
| 5,612,890 A | 3/1997 | Strasser et al. |
| 5,709,317 A | 1/1998 | Bertram et al. |
| H1743 H | 8/1998 | Graves et al. |
| 5,801,951 A | 9/1998 | Burns, II et al. |
| 5,844,808 A | 12/1998 | Konsmo et al. |
| 5,870,698 A | 2/1999 | Riedel et al. |

* cited by examiner

Primary Examiner—Khoi H. Tran
(74) Attorney, Agent, or Firm—Vedder Price Kaufman & Kammholz

(57) ABSTRACT

This embodiment relates generally to a foam dispensing system, and more particularly to an automated monitoring and diagnostic system for use with foam dispensing systems that permits remote control of the dispensing of foam. A control console is provided that is interconnected, preferably by way of a high-speed data link, with a foam dispenser, the A and B foam component pumps, a power source and controller, and a gateway. The console preferably includes a plurality of individual control circuits, typically disposed within one or more integrated circuits. The console may instead, or additionally, include software to perform some or all of the data exchange functions. The control circuits and/or software are preferably disposed within modules that are mounted to various components of the system. The modules may include one or more sensors operatively connected to the controller that monitor and record operational parameters. The system can optionally incorporate a wide-area network and multiple local-area networks, wherein each local-area network is dedicated to a single foam-dispensing unit and includes a main console and gateway associated therewith.

24 Claims, 17 Drawing Sheets

AUTOMATED SYSTEM FOR CONTROL AND DIAGNOSTICS FOR DISPENSING SYSTEMS

BACKGROUND OF THE INVENTION

The present invention relates generally to a foam dispensing system, and more particularly to an automated monitoring and diagnostic system for use with foam dispensing systems that permits remote control of the dispensing of foam.

Many foam-dispensing systems are known in the art and are used in different industries. These systems are used to dispense two component polyurethane foams in various applications. Such foams are made from two reactive foam components that are mixed together to form an expansive foam. This foam has many different uses. It may be used to provide thermal insulation to apparatus, such as whirlpool or spa tubs, or it may be used to provide sound and/or thermal insulation to electronic and mechanical devices, or it can be used to provide packing cushions for the shipping of products.

Taking the packing cushion industry as an example, many foam injection systems are known in which a hand-held dispensing gun, or unit, is connected to remote supplies of the two foam components by a pair of hoses. This hand-held dispensing unit may be fed from a local storage supply of the two foam components by way of a pair of pumps, each of which propel foam components through their respective hoses to the dispenser. Alternatively, the dispenser may be connected to bulk supply sources of these components by lengthy pipes or tubes. A manufacturing facility may utilize multiple foam dispensing stations, each with their own dispenser. It is difficult to monitor the pumps, supply sources, and foam component ratios and pressures at all of these multiple locations. In order to determine if each station is operating at its peak efficiency, an operator must examine these parameters for each dispensing station. Where dispensing stations are fed by separate supply sources, the supply of foam components cannot be monitored on a real time basis, but rather each supply source must be monitored and compared to the other supply sources. This requires an excessive amount of time and effort on the part of the system operator(s).

Other operational parameters that need to be monitored in the foam dispensing industry relate to maintenance and trouble-shooting of the dispensing systems. Mechanical wear on the dispensing system components include the wear and tear on the foam component pumps and the dispensing nozzles. In the current state of operation, a plant operator has to examine each and every dispensing station and its associated components. Accordingly, technicians must be dispatched to foam dispensing plant sites, which is both time consuming and expensive.

Some automated systems for monitoring dispensing apparatus are known and utilize multiple monitors. As the operator dispenses the foam components, monitors associated with the foam component supplies may provide an indication as to various parameters of the foam components such as temperature, pressure, and volume. The operators may read these parameters and adjust them, if necessary. In instances such as this, the operator must leave his dispensing station and walk over to a controller of the system to make the necessary adjustments. An example of such a system is described in U.S. Pat. No. 5,388,761, issued Feb. 14, 1995.

Other automated systems are described in U.S. Pat. No. 5,870,698, issued Feb. 9, 1999, and U.S. Pat. No. 5,608,643, issued Mar. 4, 1997. In the latter of these two patents, a system is described for managing multiple dispensing units that are bins that contain a preselected number and level of objects. The bins each have a level sensor that is coupled to a controller so as to inform a system operator of a low condition of objects in the bin. Although in this system, multiple bins are linked together by a network of sensors, no provision is made for diagnostic measures or any other operational system parameters that are returned as data to the central controller of the network for analysis and adjustment. The bin-dispensing nature of this system does not include aspects of wear and flow passage buildup, or even temperature, all of which are factors that influence and effect the dispensing of expandable foams.

One system currently known in the field of foam dispensing involves the use of various components manufactured by the Gusmer Company of Lakewood, N.J. Gusmer manufactures chemical component spray guns that may be used in association with its Model VH-300 High Pressure Metering Unit. This unit is very large and contains a pair of chemical component pumps that are mounted in the unit and controllable from an operation console of the unit. Heaters are supplied with supply hoses and are controllable from the console to maintain the temperatures of the chemical components. The time of the chemical dispensing may be measured by timers that interface with the unit and gun. Although this unit is mounted on wheels and thus is movable, it is not equipped with the necessary electronics to permit remote monitoring of the system operating parameters. No means are provided to interconnect the unit with other such units, nor are any means provided by which the data from many such units can be collected and analyzed to optimize the dispensing of foam.

Another system made by Cannon Afros USA of Cranberry Township, Pa. and is known as their "A-System". This system is hard mounted to a factory floor and incorporates in it, a bulky support structure that supports a pair of chemical component supply tanks with self-contained agitator motors that output to supply pumps driven by a single motor. Hoses deliver the chemical components to a dispensing gun. This system utilizes a controller that controls the process parameters of the foam dispensing system during operation.

These aforementioned systems measure some parameters, but are disadvantageous because they suffer from a lack of important and total information exchange and are extremely limited in the data that they collect. Such systems are mostly dedicated only to monitoring the supply and flow of the foam components.

The present invention, therefore, is directed to a system that overcomes the aforementioned disadvantages

SUMMARY OF THE INVENTION

Accordingly, it is a general object of the present invention to provide a control and diagnostic system for use with the foam dispensing industry in which the system links together individual foam dispensing systems with a computer network and a controller.

Another object of the present invention is to provide an integrated control system for use in a foam dispensing operation that interconnects and exchanges data among a plurality of stations used in a foam dispensing process, and a controller so as to permit the exchange of information about operational parameters of the foam dispensing operation among the stations and a controller.

A further object of the present invention is to provide a control and diagnostic system for use in the foam-dispensing field, wherein two-components foams are dispensed from dispensers at various foam dispensing stations, the system tying together, from an information exchange aspect, individual foam dispensing stations, foam component dispensed from the total supply, foam component delivery stations, and other related stations so that the pressure and temperature of the foam components may also be monitored at a remote location and controlled from a remote console.

Yet another object of the present invention is to provide a system for monitoring the status of various foam component stations associated with a foam dispensing operation, the system including a plurality of sensors disposed at various stations in the foam dispensing operation, the sensors being interconnected with a central controller by way of data communication links, the sensors reading status of the stations and relaying the status of the stations to the central controller.

Still another object of the present invention is to provide a control and diagnostic system for a foam dispensing operation utilizing a plurality of sensors disposed at individual stations of the foam dispensing operation, the sensors being interconnected to a controller by a plurality of data communication links, the sensors being capable of relaying data concerning the status of the stations to the controller, the sensors being operatively connected to control circuits of their associated stations, the system further including a diagnostic network operatively connected to the stations and accessible by a master controller of the system located remotely from the foam dispensing operation, the network including a telephone, fiber optic line, or the like over which information from the sensors may be transmitted to the remote master controller, whereby the system master controller may gather data from the sensors, analyze the gathered data, and adjust operational parameters at one or more of the system stations.

Still another object of the present invention is to provide a plurality of sensors operatively associated with each system component, the sensors operatively interconnected to each other and to a master controller, each of the sensors containing means for monitoring operational parameters of the system, the master controller being interconnected to a data exchange gateway, whereby system parameters and information collected by the master controller may be monitored from a remote location, the remote location permitting a system operator to access system information from off-site.

The above objects and advantages are accomplished by the structure of the present invention. In one principal aspect of the present invention and as exemplified by a first embodiment thereof, a control console is provided that is interconnected with a foam dispenser, the A and B foam component pumps, a power source and controller and a gateway. The interconnection among these components is preferably a high-speed data link that is capable of virtually instantaneous signal transmission to the console and back. The console preferably includes a plurality of individual control circuits, typically disposed within one or more integrated circuits ("IC") such that individual circuits are dedicated to the exchange of data and information among the individual foam dispensing system components and the system controller or console. The console may instead, or additionally, include software to perform some or all of the data exchange functions.

The control circuits and/or software are preferably disposed within modules that are mounted to various components of the system, such as, for example, the dispensing unit(s), the pumps supplying the dispensing unit(s), and the supply sources of foam components for the dispensing unit(s). The modules may include one or more sensors that monitor and record operational parameters such as temperature, pressure, flow rate, etc. The sensors are interconnected with each other, and each of the circuits is operatively connected to the controller so as to define a plurality of individual monitoring circuits that relay data to and from the console of the system. Each circuit may be considered as a slave circuit that is dominated by and obedient to a master circuit. That is, for example, a slave circuit will make requests of a master circuit, which will in turn control when and if a response is given to the slave circuit. The effect of such a control relationship will be further examined with respect to FIGS. 10–14. The master circuit may be resident in the control console and connected to a gateway to an exterior source of communication so that the entire system may be remotely monitored, even while the console is in use.

By using individual sensor modules in association with individual system components, the system of the invention may be used on automated dispensing systems as well as hand held dispensing systems where previously it has been impractical to monitor the operation of the dispensing unit. Flow rates and chemical usage may be monitored as well as the quantity of foam used for each shot of the gun. In this manner, system operators may use the system to determine which operators on an assembly line are efficient foam-using operators. The system may also be used to monitor the total quantity of chemical foam components through the system and give the system operator an indication as to potential maintenance issues before they rise to a level of criticality that necessitates a system shutdown.

In yet another principal aspect of the present invention, the system incorporates a wide-area network ("WAN") and multiple local-area networks ("LAN"), wherein each of the LANs is dedicated to a single foam-dispensing unit and includes a main console and gateway associated therewith. Each LAN therefore defines a single control "loop" of the WAN and then can be used on each individual foam-dispensing station present in a factory or on an assembly line in a plant. All of the LANs are tied together to form the WAN by means of interconnections between their respective gateway modules and the WAN master module so that each LAN in the WAN may be monitored individually from the WAN (and preferably from a remote location). This remote monitoring permits a remote system operator to diagnose problems and/or maintenance aspects of each of the dispensing stations of the system (WAN) or in station (LAN) by itself.

The WAN may include a datastore (not shown) that is partitioned into a plurality of individually addressable (readable and writeable) memories or data storage areas, each of which may correspond to an individual LAN, which in turn is mapped within the entire system (WAN) so that the WAN may display, if desired, the operational status of each foam dispensing station or unit in a factory or plant. Each LAN has its own main console module that manages its associated LAN independent of all of the other LANs that make up the WAN. Thus, the system provides its operator with status information about each dispensing station individually, and as parts of an entire plant or factory.

In yet another principal aspect of the present invention, the system may be utilized with and housed within a single, moveable console that optionally has a wheeled base to permit it to be moved from one location to another. The console includes a cabinet extending up from the base that houses a controller with a plurality of control circuits that interconnect system components that are mounted within the cabinet such as chemical component pumps, and supply tanks. The console has a dispensing gun associated with it and supply hoses that interconnect the dispensing gun to the supply pumps. The controller permits the operational system parameters to be monitored and modified at the console, and a display panel with a plurality of visual displays presents the system parameters in real time. The console operator, and even the gun operator, can view the duration of the foam shots, calculated by way of a timer, as well as the quantity of foam components dispensed with each shot and the amount of foam components remaining in the supply tanks so that the number of remaining shots may be easily determined.

These and other objects, features, and advantages of the present invention will be clearly understood through a consideration of the following detailed description.

BRIEF DESCRIPTION OF THE DRAWINGS

In the course of this detailed description, the reference will be frequently made to the attached drawings in which.

DETAILED DESCRIPTION OF THE PREFERRED EMBODIMENTS

This embodiment of the present invention is directed to an improved system for management of chemical streams that could be formed from two or more streams, resulting in a chemical reaction to form cured chemical substance. A typical use of this invention is in the use of two chemical components such as a polyol and an isocyanate. These components, when mixed together, form a polyurethane foam that typically expands to fill a cavity, although some formulations may be used which have minimal or no expansion. Foams of these types are used in many industries. One common application for such foams is the packing field, where the foam components are mixed together and injected into a container to form a cushion for an article packed in the container. Another common application is in the insulation of products, such a hot tubs and spas wherein the foam is used to provide a thermally insulating layer or coating on a product. These foams may be dispensed through automated dispensers or may be applied through a hand-held dispenser. In either instance, it is important to know the amounts of foam components that are be used at any given time in the operation of the dispensing unit, because the two foam components (known in the art as an "A" and "B" component) must be mixed in a particular ratio which may affect the degree to which the mixed foam expands, its cure time, and other aspects.

Figure 1:
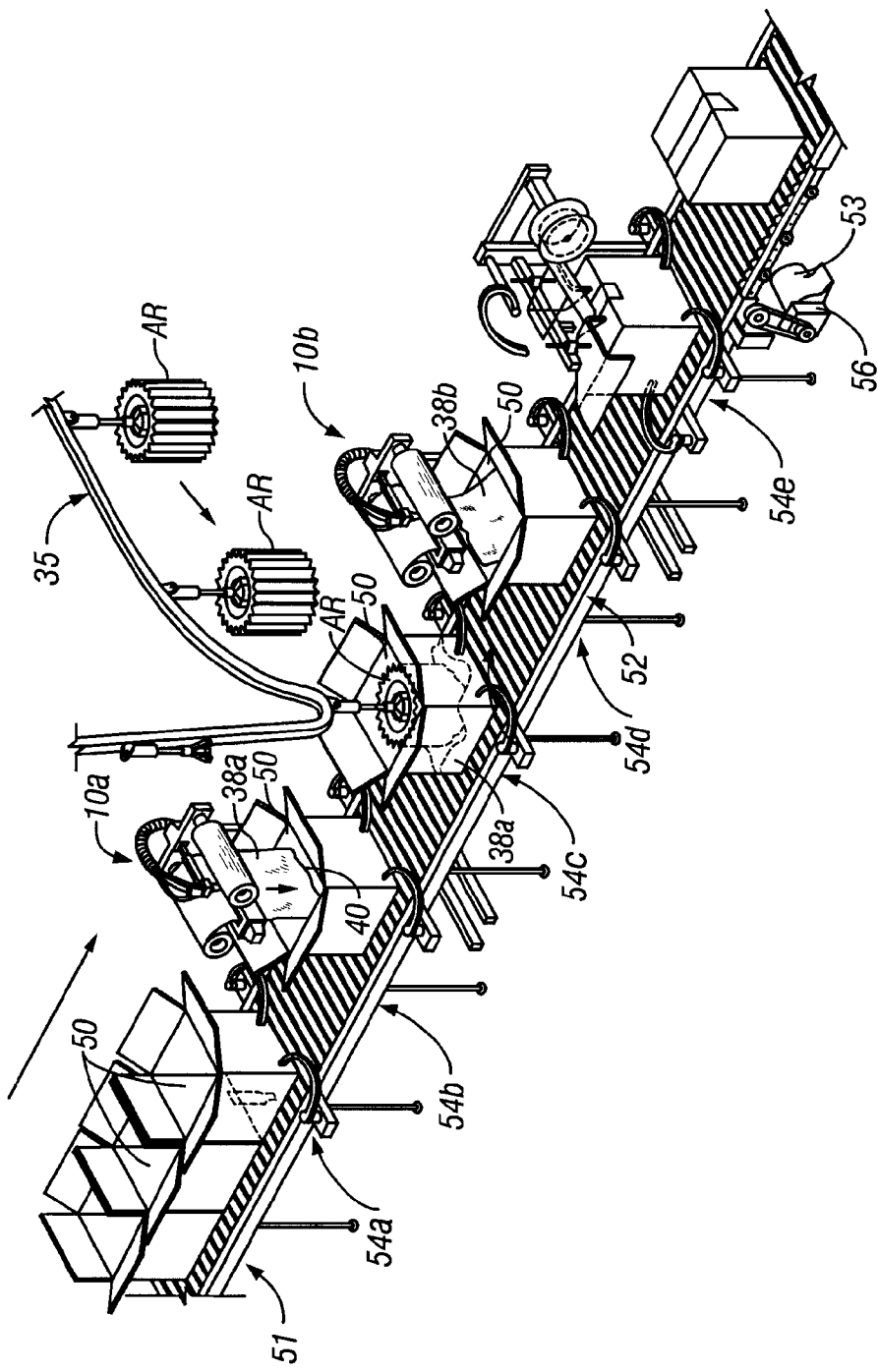
FIG. 1 is a perspective view of a known foam dispensing system illustrating the components that make up such a system.

FIG. 1 is taken from U.S. Pat. No. 4,938,007, issued Jul. 3, 1990 and illustrates a conventional automated foam cushion system that may be employed in an article-packing assembly line. In such a system, a first conveyor 20 is provided to convey empty boxes, or cartons, 50 along an assembly path 52. The boxes 50 are held up at a feeding station 51, where they are sequentially released to a first foam dispensing and cushion-making station 54*b* is located. At this station 54*b*, first a foam dispensing apparatus 10*a* is provided and injects a two-component expandable polyurethane foam (not shown) into a first flexible bag 38*a* that is formed from a folded plastic sheet 40 and which is advanced from a supply roll through the dispensing apparatus 10*a*. This first bag 38*a* is dropped into the empty box 50, and the foam expands as the box moves to its next station, an article loading station 54*e*, on the assembly path 52. At this station, an article AR is conveyed along a second conveyor 35 and is deposited into the box 50 on top of the first foam cushion bag 38*a*. The box is then advanced to a second foam dispensing station 54*d* where a second foam dispensing apparatus 10*b* forms a second foam cushion bag 38*b* and deposits it in the box 50 on top of the article AR. Once this second cushion bag 38*b* is deposited, the box advances to a box 50 closing and sealing station 54*e* where it is sealed with tape 53 from a dispenser 56 and sent to a shipping location (not shown).

In such a system, two foam dispensing stations 54*b*, 54*d* are present on a single assembly line 52. A manufacturing plant may have multiple assembly lines such as that depicted in FIG. 1, and the foam components are typically fed to the foam dispensing stations 54*b*, 54*d* in such systems by way of pipes or hoses (not shown). Pumps may be located at or near the foam dispensing stations 54*b*, 54*d* to propel the foam components separately through the hoses or pipes to the dispensers 10a, 10b. In FIG. 1, the foam dispensing units 10a, 10b are shown as part of the assembly line 52 and which are mounted to the assembly line 52. The foam dispensing units 10a, 10b may also be of the type that may incorporate the foam component supply sources into themselves.

Figure 2:
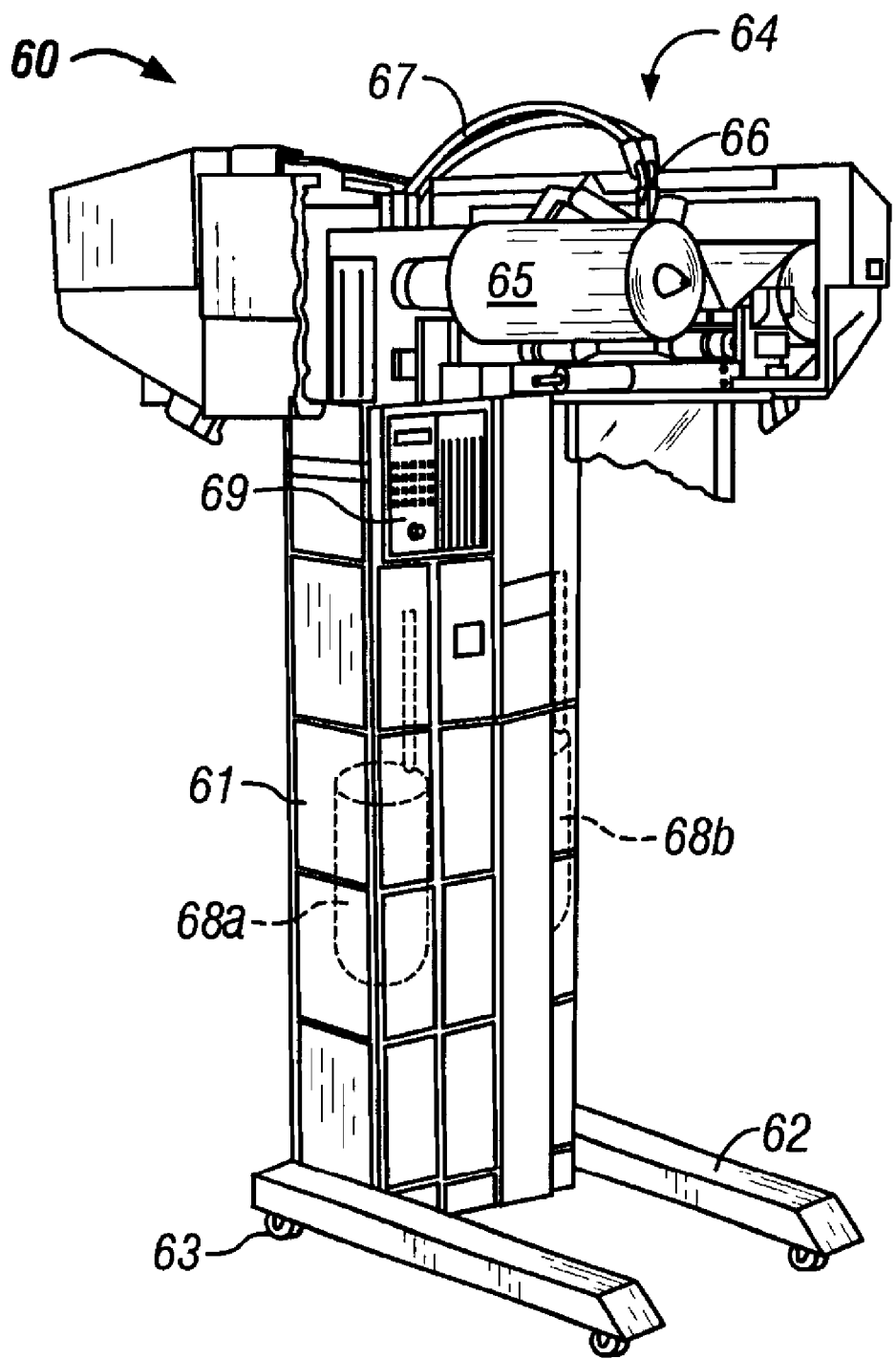
FIG. 2 is a perspective view of another known foam dispensing apparatus that may be used with the dispensing system of FIG. 1.

Such a unit is illustrated in FIG. 2, where the unit is illustrated as a stand-alone dispensing unit 60 that has a vertical support structure, shown as a cabinet 61, that extends upwardly from a base 63 that has a series of wheels on it for mobility. A dispensing head 64 is supported on the cabinet 61 and preferably extends to one side of the dispensing unit 60. The dispensing head 64 may include a single dispensing nozzle 66 which discharges a mixed foam into a plastic bag that is fed from a bag supply 65, or it may include, as illustrated, a pair of separate discharge nozzles 66 that are each fed by a separate feed hose 67 which lead to respective supply sources of foam components, such as supply tanks 68a, 68b as illustrated. This dispensing unit 60 may include a control panel 69 that displays needed information for determining the desired ratios of the foam components, such as the temperature and flow rate of the foam components.

Figure 5:
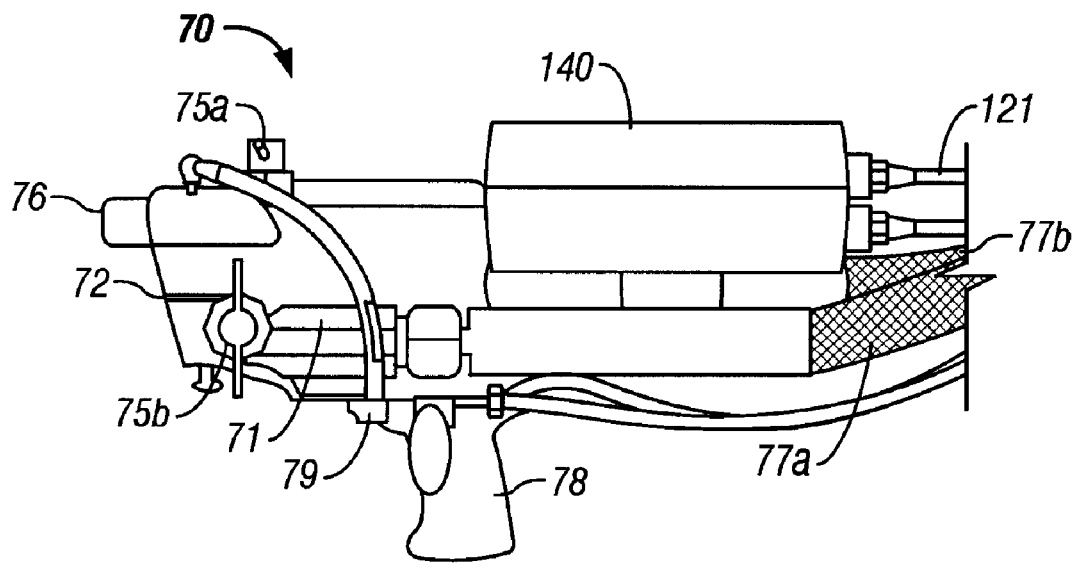
FIG. 5 is a perspective view of a hand-held foam-dispensing unit used with the diagnostic and control system of FIG. 3.
Figure 6:
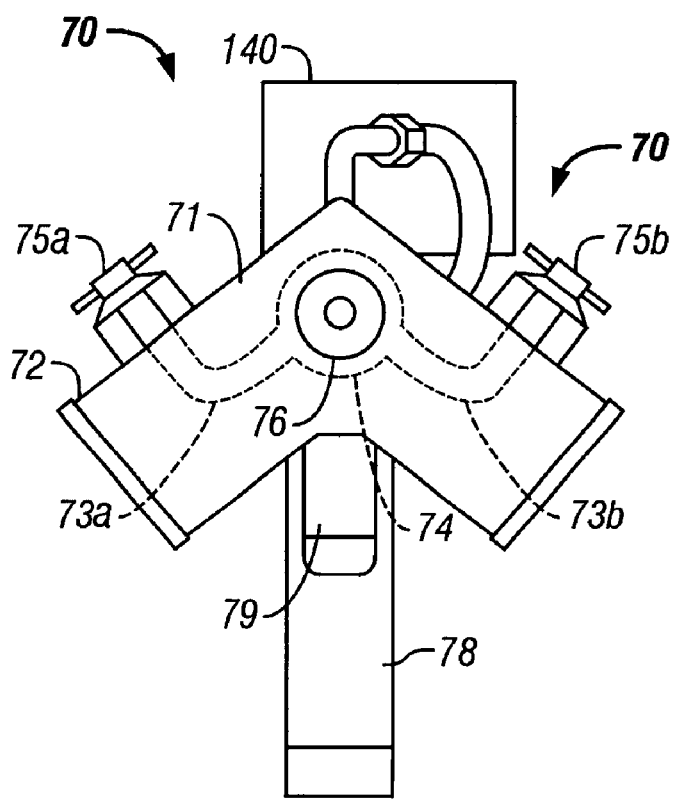
FIG. 6 is a front elevational view of the dispensing unit of FIG. 5.

FIG. 5 illustrates a handheld dispensing unit 70 of the type that may be utilized with the system of this embodiment to apply foam to an object or into a bag. Previously, such a handheld dispensing unit 70 was primitive in its process control ability and did not monitor the temperature or flow rate or record historical data. The dispensing unit 70 typically includes a body 71 with an end 72 having a pair of hollow, internal passages 73a, 73b (as illustrated in FIG. 6) formed therein that lead up to an internal mixing chamber 74 (also illustrated in FIG. 6), which in turn leads to a dispensing nozzle 76. Individual shut-off valves 75a, 75b are provided on the dispensing unit body front end 72 and provide a means for shutting off the flow of the foam components through the passages 73a, 73b. The dispensing unit relies upon a series of supply hoses 77a, 77b to convey foam components to the dispensing unit and the supply hoses 77a, 77b, as illustrated, enter the dispensing unit body 71 from the rear portion thereof. A handle 78 with a (preferably spring-loaded) trigger 79 is provided to facilitate the operation of the dispensing unit 70 and to provide a comfortable grip for the dispensing unit 70. It should be noted that one of ordinary skill in the art would recognize that other forms of handheld dispensers could be used in connection with this embodiment.

Figure 7:
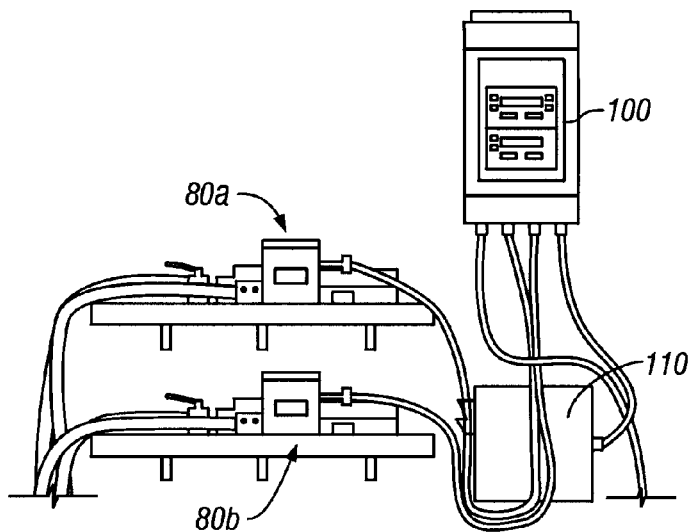
FIG. 7 is an elevational view of a pair of system pumps with data modules and control console operatively connected thereto.

The supply hoses 77a, 77b may lead to individual pumps 80a, 80b, illustrated in FIG. 7, which draw foam components through the supply hoses 77a, 77b to the pumps 80a, 80b and propel them to the dispensing unit 70. Due to the densities and viscosities of typical foam components, the pumps 80a, 80b are preferably of the gerotor type, having in internal driving element in the form of a gear that rotates within a pumping chamber in a hypocycloid action. In stand-alone units, such as that illustrated in FIG. 2, the foam component supply sources may include pressurized tanks that contain the foam components under pressure and supply a positive pressure head through the supply hoses 77a, 77b to the discharge nozzle(s) 66 of the dispensing unit 70. Thermistors may be housed in the supply hoses 77a, 77b to monitor the temperature of the foam components, but thermocouples may be used in some applications in place of thermistors.

This embodiment is directed to an industrial system that is useful in accurately dispensing and blending chemical foam components, preferably at least two or more. The system of this embodiment interconnects, or "links" together, the various system components so that virtually all of the dispensing system parameters may be monitored. The system gathers and processes data generated in the dispensing cycle and, if configured to do so, can interact with other equipment or personnel concerned with the process.

Figure 3:
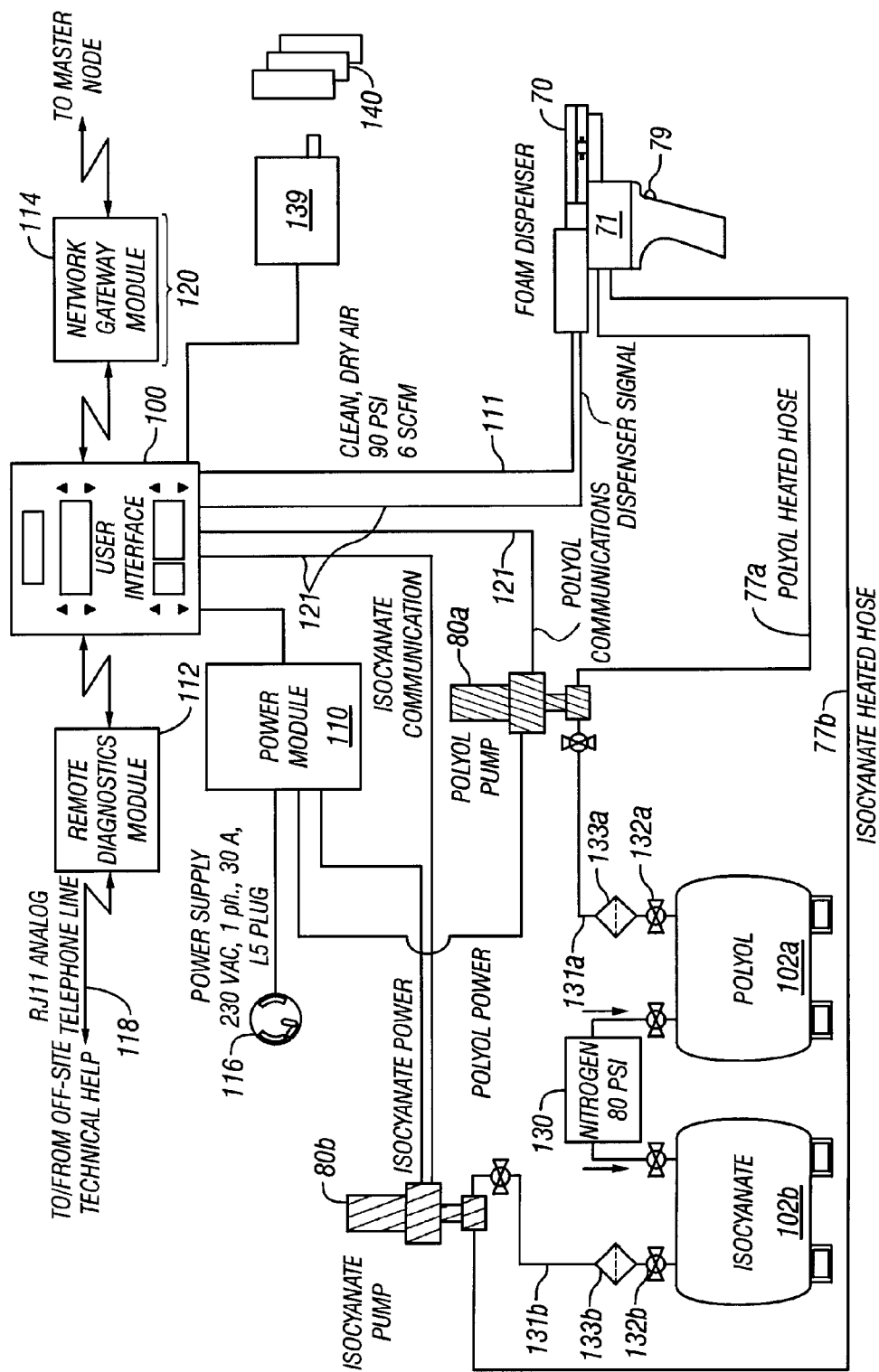
FIG. 3 is a general schematic diagram of a diagnostic and control system constructed in accordance with the principles of the present invention with components of a foam dispensing system as shown interconnecting various foam dispensing stations in an assembly process.

FIG. 3 illustrates schematically this embodiment incorporated within a foam dispensing system. As illustrated therein, a user interface 100 is provided and may take the form of a control console or the like which interconnects the system components together, such as the supply sources 102a, 102b, which may be in pressurized supply tanks of separate A and B foam components under the pressure of an inert gas (not shown), such as Nitrogen or other suitable gas. These supply sources 102a, 102b may include outlet pipes 131a, 131b which may have ball valves 132a, 132b disposed in line therewith for control of the flow, and filters 133a, 133b to filter out undesirable particles and debris (not shown). The outlet pipes 131 lead to individual foam component pumps 80a, 80b that apply a pumping pressure, or head to the foam components traveling through supply hoses 77a, 77b that lead from the pumps 80a, 80b to the dispensing unit 70 where the supply hoses 77a, 77b enter the dispensing unit body 71 and direct the foam components into the mixing chamber 76 as shown in FIG. 6. A pneumatic supply line may be provided from a source of pressurized air to the dispensing unit 70.

In an important aspect of this embodiment, the dispensing unit 70 is interconnected to the user interface 100 by means of electrical cables 121 that are constructed to transmit signals, such as coaxial cables or the like. These cables, or interconnects, also extend between the foam component pumps 80a, 80b and the user interface 100 so that data and information may be exchanged between the pumps 80a, 80b and the user interface 100. In this manner, the operational parameters of the pumps 80a, 80b and dispensing unit 70 may be monitored, controlled, and diagnosed.

Figure 4:
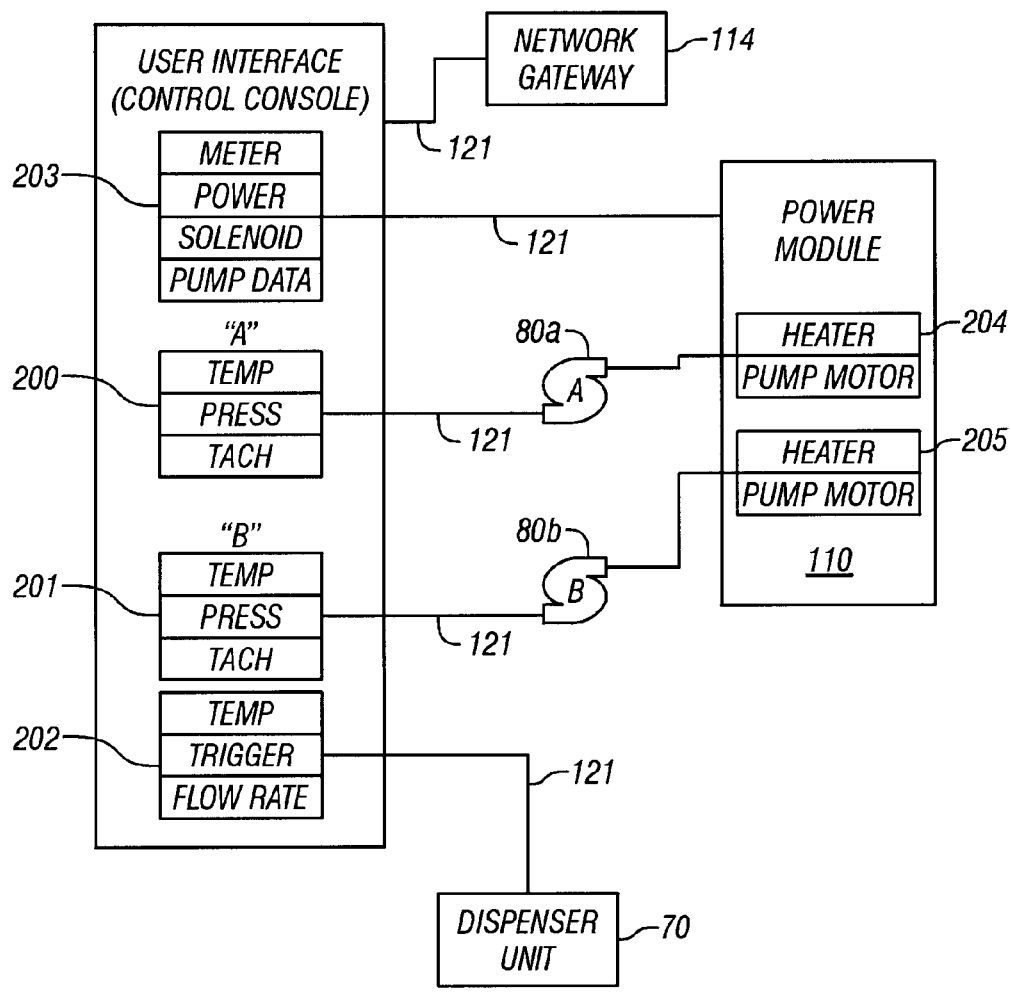
FIG. 4 is a schematic of the electrical control and data information exchange aspect of the diagnostic and control system of FIG. 3.

FIG. 4 illustrates an electrical control schematic of the system of FIG. 3. As illustrated in FIG. 4, the user interface 100 (control console) may have means for reading and analyzing the temperature, flow rate, and trigger actuation of the dispensing unit 70 within a single control circuit 202. It may also include control circuits 200, 201 that can read, analyze, and monitor the temperature, pressure, and revolutions (RPM, by using a tachometer) encountered at the pumps 80a, 80b, as well as a power control circuit 203 that may read, analyze, and monitor the heat, power, and other related data of the power used by the pumps 80a, 80b. One such module is shown at 110, and it includes circuits that monitor, read, and analyze information about the power that energizes and drives the pumps 80a, 80b and heaters 204, 205 for the supply hoses.

The system of this embodiment has a small footprint or "form factor" and utilizes a plurality of similar process control and data reporting abilities. In this regard, it utilizes a plurality of sensors that are attached to the system components, such as the A and B pump modules 80a, 80b. The sensors may take a number of forms including, but not limited to, voltage, volume, revolution speed, temperature and pressure sensors. For example, the sensors might include transducers for monitoring the pressure of the foam components in the supply hoses; thermistors for monitoring the temperature of the foam components in the hoses 77a, 77b or as they enter the mixing chamber of the dispensing unit 70; tachometers to measure the speed of the pumps (preferably in revolutions per unit of time), the load applied to the motor, and its operating temperature; flow measuring devices incorporated in pump modules 80*a*, 80*b* for monitoring the flow of the foam components through the dispensing unit 70; a trigger switch that may determine when and how long the trigger of the dispensing unit 70 is pressed into a condition for opening of internal valves so that foam components may enter the mixing chamber; and, if desired, a clock or other form of timer that determines the duration of each depression of the trigger, commonly referred to in the industry as a "shot." That is, the duration of the shot is controlled by the amount of time the user holds the trigger, but alternatively, the duration of the shot can be governed by system parameters. For example, the clock can designate that the shot last a predetermined amount of time, or the clock may designate that, for a fixed series of shots, each shot in the series has its own assigned duration and upon completion of the series of shots, the series begins anew.

A pair of pressure sensors is preferably located at the pump manifold or output and use transducers to determine the pressure of the foam components dispensed from the pumps 80*a*, 80*b*. These sensors are monitored for upper and lower limits and if either is exceeded, they will generate an alarm signal that is read by the controller, which may then place the system into a pump shutdown mode. Additional sensors monitor the pump speed, preferably by sensing and determining the pump shaft rotation, and the rotation of the shaft is computed at the controller to verify the operation of the pumps 80*a*, 80*b* and to calculate the amount of foam component being dispensed by interpolation from pump data tables for the specific size and style of gerotor elements used in the system pumps 80*a*, 80*b*. The sensor used to determine actuation of the trigger can include a normally open switch that, when closed, sends a signal to the console, which is timed to determine the duration of the actuation of the trigger. The sensors of the system modules may also be used to monitor the level of foam components within the supply sources without the need for level switches or the like used in association with the supply sources. Rather, the system determines the amount of each foam component that has been dispensed by analyzing and recording the number of revolutions of the gerotor elements of the gerotor pumps 80*a*, 80*b*, where the amount is constantly subtracted from the initial amount known to be in the supply sources. In an alternate embodiment of the system, the supply sources themselves can have electronic means to monitor the quantity of foam components that remain in the supply sources. In either embodiment, the amount remaining can be input into a dispensing management system that is connected to a real time inventory. Thus, the amount of available inventory can be monitored, locally and/or remotely, in real time by way of the active online inventory.

In an alternative embodiment, the dispensing unit 70 of FIGS. 5 and 6 includes a plurality of sensors (not shown). In any embodiment, not only can the operational characteristics of the motors be determined and monitored insofar as the foam components are concerned. It will be therefore understood, that this aspect of this embodiment presents more than just supply information to the user interface that is provided by known dispensing system. In the systems of the invention all of the sensors may be operatively connected to each other, but they need not be and the system will operate in a similar manner.

By virtue of linking all of the system components together, the user interface 100 permits a system operator to monitor the usage of chemicals to a point where foam dispensing may utilize bulk tanks, pressurized and non-pressurized supplies of the foam components which gives the system operator an option of monitoring each foam station independently or collectively to manage and monitor inventories of foam components supplies.

Returning to FIG. 3, the system, which will be referred to as "tank-fed," includes a pair of supply sources 102*a*, 102*b* (in the form of pressurized chemical tanks) and two supply pipe or hose trains 131*a*, 131*b*, which are non-heated and run between the supply sources 102*a*, 102*b* and the pumps 80*a*, 80*b*, preferably of the AC motor-driven gerotor type. Two internally heated hose trains 77*a*, 77*b* lead to the dispensing unit 70, and the system receives power from a power module 110 that may be incorporated within a motor control assembly, which in turn is interconnected to the user interface 100, which provides process control and user interface circuitry for the system. An appropriate database-driven software will be utilized to monitor and compare the various operational parameters received from the system modules and to make decisions based upon that information.

The system of this embodiment is very user-friendly in that it may incorporate various means of operation. It may utilize a personal or laptop computer to access it using signal interconnection means 120 that will access the system through a gateway 114 or through a remote diagnostics module 112, which will permit the user interface 100 to mate with standard IBM PCs and clones (not shown) so that the system may be easily interfaced with other plant equipment and processes. It may mate with a PLC (Programmable Logic Controller) and even a barcode reader module 139 that scans and reads barcodes 140 used in the foam dispensing process.

As for the foam dispensing system hardware, the supply sources 102*a*, 102*b* will typically include commercially available pressurized chemical tanks that range in capacity from 60 gallons to 1850 gallons. The supply sources 102*a*, 102*b* are preferably refillable and are pressurized from 40 to 80 psi. The tanks 102*a*, 102*b* mate with standard chemical handling hoses or pipes 131*a*, 131*b* to route and convey chemicals to the pumps 80*a*, 80*b*. If the pumps 80*a*, 80*b* are gerotor pumps, they may use one gerotor pump head, or a stacked arrangement with multiple gerotors to obtain increased output in a modular fashion. The pump motors are actively controlled by the interface 100 by using speed or tachometer information sent by the motors, and by hose pressure information. For their gerotors the pumps 80*a*, 80*b* use profiles that have been developed for use with polyurethane chemicals.

The pumps 80*a*, 80*b* output to internally heated hose trains in which chemical grade hoses 77*a*, 77*b* are provided with internal heaters (not shown) in direct contact with the chemicals. The hoses 77*a*, 77*b* use thermistors in direct contact with the chemicals to provide feedback to the user interface 100. The hoses 77*a*, 77*b* are preferably heated by one or more heaters powerful enough to bring the chemicals up to the desired temperature along the hose length, and also sensitive enough to operate within a relatively narrow temperature tolerance.

Motor control circuitry or power module 110 can be contained within an enclosure that includes the motor power supply and other electronics needed to control the pump motors. The higher heat and voltage sensors will be contained within this power module 110 so that the user interface 100 may have a smaller footprint so that it may be mounted in a remote location, as is shown in FIG. 7. The interface unit 100 typically houses a microprocessor and circuitry, as explained above, that controls heaters and motors, interprets signals from the various modules, records data from the process, and actuates output signals to the user display and to certain modules. The user interface 100 may have a visual display and various tactile switches, such as membrane switches.

Importantly, the user interface 100 of this embodiment permits monitoring, including remote monitoring, of the various components of the foam dispensing system and the various parameters that occur during operation of the dispensing system. The barcode reader 139 permits the console to interact with other equipment such as a data collection module mounted on one or more conveyors of a system such as illustrated in FIG. 1. One or more barcode readers are preferably linked to the console and its controller and are used to identify what parts are being loaded and the identification of a particular style part will cause the console to select and control a shot of a specific duration.

For example, returning to FIG. 1, the systems of the invention may be further used to monitor and control the quantities of foam being dispensed by the multiple foam dispensing apparatuses 10a and 10b into their respective flexible bags 38a and 38b. The system may be used to control the amount of each foam "shot" that is dispensed into the cushion bags. This control may by way of controlling the duration of each shot, controlling the amount foam delivered to the foam dispenser by the foam component supply pumps, for example. The level of foam components may also be monitored so that when their levels are exhausted or run down to a very low condition, the feeding of article boxes 50 from the box feeding station 54a may be stopped, if necessary, along with the main conveyor 51 as well as the second conveyor 35 that conveys the articles AR being packed to their boxes 50.

Figure 8:
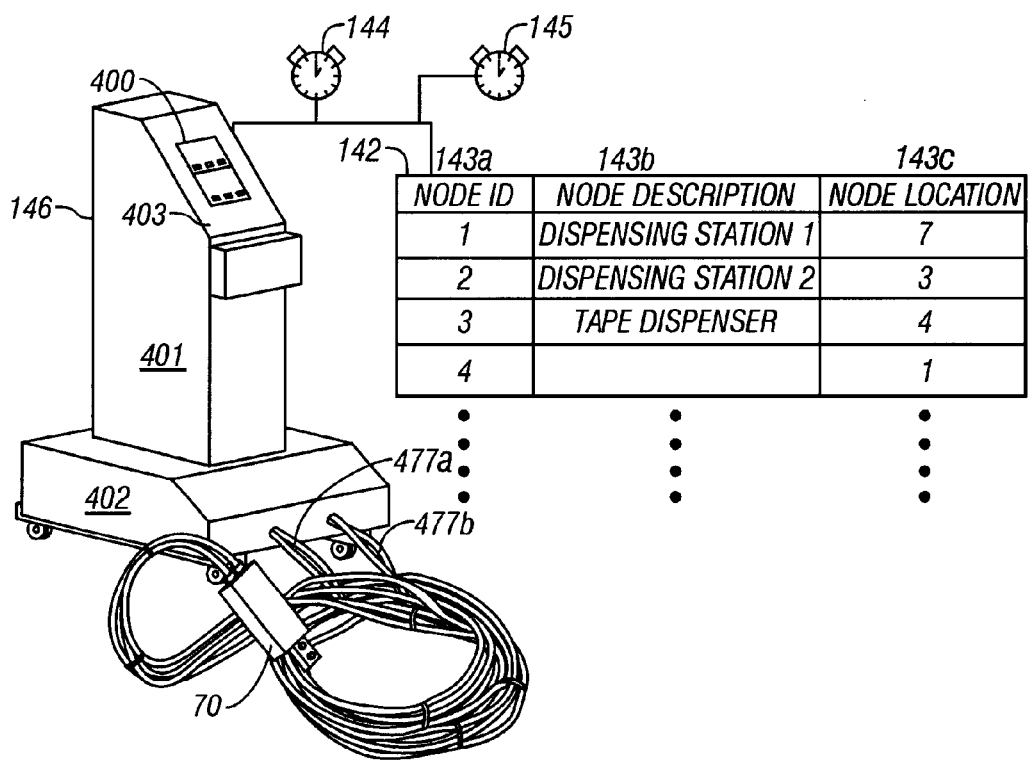
FIG. 8 is a perspective view of the dispensing system that may be utilized with the diagnostic and control system of the present invention and illustrated interconnected with a dispensing unit by a series of hoses and cables, and a representation of the relationship between the console, a first timer, a second timer, and a datastore.

Referring to FIG. 8, as mentioned above, the system includes a LAN datastore 142 in which each node (i.e., operation or dispensing station) is identified by node identifier 143a and mapped to its on-the-floor location, and further mapped within the LAN datastore 142 as its network address and textual representation of its location respectively. The LAN datastore 142 reads the station identifier 143a and utilizes it in generating status and operation reports for the station as well as summary calculations thereof. The LAN datastore 142 can take any format well known in the art. For example, such a format can be that of a relational database, a non-relational database, a record manager, a flat file, or any other suitable datastore format commonly known in the art. By way of example, the LAN datastore 142, as illustrated, includes a node description 143b and a node location identifier 143c representing the physical location of each node.

The system includes a first clock 144 that is connected to the LAN datastore 142 and to the console 146 of the system so that the time and date of the shot is recorded by the console. The first clock 144 "stamps," or electronically records, the time and date of the shot, preferably in a four-digit (hour and minute) field format using a 24-hour clock, such as 18:23 being generated to record a shot that took place on a specific date at 6:23 in the evening (pm). The system also includes a second clock 145 that is used to record the duration of the shot so that the total amount of the foam dispensed may be recorded. This second clock 145 is also connected to the LAN datastore.

Other parameters such as quantitative parameters are also recorded within the system and sent to and recorded in the LAN datastore 142, two of them including the amount of the foam A and B components. This may be calculated by recording the revolutions of the pumps 80a, 80b used and the specific gravity of the foam component. The temperatures of both the A and B foam components can be recorded prior to the end of the shot, as well as the pressure of the A and B components at the end of the shot. All of this sensor information is sent to and collected by the LAN datastore 142, where it can be accessed and processed by the controller of the system.

Figure 9:
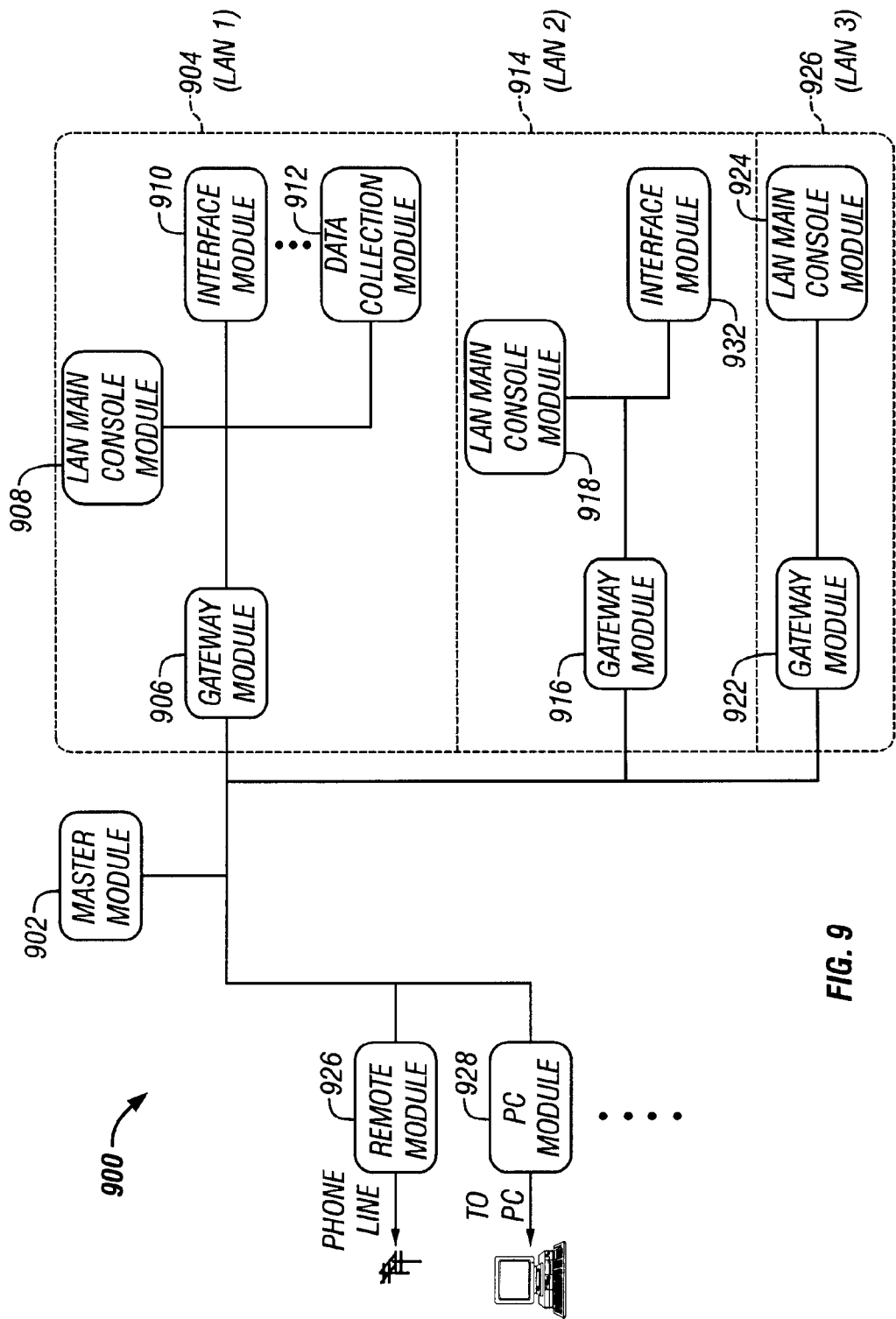
FIG. 9 is a diagram of an example wide area network configuration of the present invention, which schematically illustrates the use of the present invention within a factory or plant.

FIG. 9 is a diagram of an example wide area network 900 ("WAN") configuration of this embodiment. With respect to this embodiment, a WAN 900 is a collection of local area networks ("LAN's") and/or individual computers that are connected through some communication means (not shown) and managed by a master module 902 residing on a processor-enabled hardware device (not shown). A processor (not shown) resides on a personal computer, minicomputer, mainframe, or any processor-enabled hardware devices well known in the art. The processor may be a microprocessor (e.g., "PENTIUM" or "POWER PC"), application-specific integrated circuits (ASIC), Field Programmable Gate Array (FPGA), a digital signal processor, a microcontroller, or any processor well known in the art.

The processor is operatively coupled to a memory (not shown), which can be read-only memory, random access memory, rewritable disk memory, write-once-read-many disk memory, electrically erasable programmable ROM (EEPROM), or any electronic memory medium well known in the art. The memory comprises instructions that are executed by the processor, as well as variables. The memory includes a WAN datastore (not shown) in which each node on the WAN (i.e., operation or dispensing station, hardware device implementing a gateway module, etc.) is identified by node identifier and mapped to its on-the-floor location, and further mapped within the WAN datastore. The WAN datastore operates in a manner similar to that described with respect to FIG. 8, and similarly can take any format well known in the art as discussed.

A LAN 904, 914, 920 is a collection of connected hardware devices managed by a LAN main console module 908, 918, 924 residing on a processor-enabled hardware device. Accordingly, the LAN main console module 904, 914, 920 manages its corresponding LAN 908, 918, 924 independently of other LANs, but all LANs 904, 914, 920 are managed by the master module 902. The communication means can take the form of direct cable connections between hardware (i.e., computer and related peripherals), cable connections centralized through a hub, telephone lines, radio waves, or any other means, or combination thereof, well known in the art. The operation of the LAN main console module 904, 914, 920 will be discussed in greater detail with respect to FIG. 13.

In the event that there is a break in a communications link between a LAN main console module and the master module, all of the data that is collected and stored in the LAN datastore during the break in communication can be marked as archived data. The archived data, which includes data related to the break in communication itself, is available for subsequent recovery and transfer to the WAN datastore associated with the master module. Through this method, the LAN datastore and the WAN datastore can be synchronized so that when communication between master module and the LAN main console module is reestablished, the respective datastores can both reflect the current state of the operations of the other module.

Such a recovery process is important because, for example, the dispensing operation may be used to regulate the inventory and purchasing systems. In one embodiment, the system reads the duration of shots so that it knows after the Nth shot that the production floor entity (i.e., the particular dispensing unit) has a low amount or no amount of, for example, component A remaining. The system then accesses an inventory datastore (not shown) and reads what is the available inventory of component A. If the available inventory is sufficient to replenish the component A tank on the floor, the system activates a replacement process in which the system places an order within the inventory datastore. If the inventory itself is low, the system may additionally initiate a purchasing process in which the system generates a flag that is sent to and received by a purchasing datastore, whereupon the purchasing department is alerted that it must order an additional quantity of component A.

The system as described in FIG. 9, can also record the data it receives from the system. This would be valuable in quality control where the manufacturer of, for example, rigid foam insulation panels can demonstrate to the buyer of the panels that each panel contains an amount and weight of foam consistent with the purchase specifications. The system can also be used to monitor and assess the efficiency of a dispensing unit operator in instances where there are no hard and fast shot duration times. The system can record the times of the shots that operator one has on his application of insulation and match them up against the shot duration of another operator at a different dispensing unit or on a different shift.

The arrangement within FIG. 9 illustrates how a factory may utilize the systems of this embodiment. Although the inner dotted line in FIG. 9 segregate the three LANs illustrated from each other, each such LAN may be considered as a single control loop that is associated with a single foam-dispensing station. The entire diagram in FIG. 9 schematically represents the extent of a factory or assembly plant in which the individual LANs are installed, and it illustrates how they are linked to a master module 902 by way of their individual gateway modules 906, 916, 922 at a master control location within the plant, which may in turn be interconnected to a PC module 928 at a control location within the plant.

Example alternative configurations for an individual LAN are illustrated. In addition to a LAN main console module 908, 918, 924, each LAN 904, 914, 920 contains a gateway module 906, 916, 922. The gateway module 906, 916, 922 acts as a slave module to both its corresponding LAN main console module 908, 918, 924 and the master module 902. The gateway module 906, 916, 922 may reside on the same hardware device (not shown) as that on which the LAN main console module 908, 918, 924 resides, or may instead reside on hardware dedicated to the gateway module 906, 916, 922. For example, the gateway module 906, 916, 922 may be a specialized software procedure that is stored in the memory of the appropriate LAN main console module 908, 918, 924, or alternatively can reside in the memory of a specialized hardware device (e.g., a personal computer) operatively attached to the appropriate LAN main console module 908, 918, 924. In an alternative embodiment, the gateway module 906, 916, 922 can be embedded physically in the structure of an IC that resides in the physical structure of either the appropriate LAN main console module 908, 918, 924 or a specialized hardware device. The operation of the gateway module 906, 916, 922 will be discussed in greater detail with respect to FIG. 11.

In contrast, LAN1 904 and LAN2 914 each include an interface module(s) 910, 932, which LAN3 920 does not (although LAN3 920 could include such a module). The interface module(s) 910, 932 are optional components that act as a slave between a LAN main console module 908, 918 and its corresponding equipment (not shown) external to the LAN 904, 914. For example, external equipment could include sensors dedicated to the LAN 904, 914, a conveyor belt, etc. As illustrated with respect to LAN1 904, multiple interface components can be added, each of which has corresponding equipment. An interface component can be dedicated to a particular hardware device or dedicated to several hardware devices. The communication between the interface module 910, 932 and their respective LAN master console modules 908, 918 is bi-directional. The interface module(s) 910, 932 may reside on the same hardware device as that on which the LAN main console module 908, 918 resides, or may instead reside on hardware dedicated to the interface module(s) 910, 932.

Moreover, LAN1 904 illustrates that a LAN can include a data collection module 912. A data collection module can be attached to a data collection device that receives data for use by its corresponding LAN main console module 908. That is, the communication between the data collection module 912 and its corresponding LAN main console module 908 is unidirectional, flowing from the data collection module 912 to its corresponding LAN main console module 908. The data elements collected can be, for example, product identification numbers such as serial numbers. The data collection device can take the form of, for example, a bar-code reader capable of reading a standard one-dimensional barcode format or a two-dimensional barcode format, such as the Code 16 k standard or "INTACTA-.CODE" graphical format. One of ordinary skill in the art will recognize that other forms of data collection devices, data elements, and standards can be used in connection with this embodiment. The data collection module 912 may reside on the same hardware device as that on which the LAN main console module 908 resides, or may instead reside on hardware dedicated to the data collection module 912.

A remote module 926 can be used as a slave module facilitating communication between the master module 902 and a remote gateway module (not shown). The remote module 926 is capable of communicating remotely by means well known in the art, such as, for example, being connected to an exterior communication means such as a telephone line, data link, radio wave generator, or the like. Accordingly, the LANs may be accessed individually and collectively from a remote location. The remote module 926 may reside on the same hardware device as that on which the LAN main console module 908, 918, 924 resides, or may instead reside on hardware dedicated to the remote module 926. The operation of the remote module 926 will be discussed in greater detail with respect to FIG. 12.

Finally, the master module 902 optionally can have a direct connection to a PC module, which acts as a slave module facilitating communication between the master module 902 and a PC. As illustrated, there can be a plurality of PC modules 928 attached to master module 902. The operation of the PC module(s) 928 will be discussed in greater detail with respect to FIG. 14.

Accordingly, within the context of the WAN, the master module 902 is a controller, and the gateway modules 906, 916, 922, the remote module 926, and the PC module(s) 928 are slave modules with respect to the master module 902. Within the context of a single LAN, the LAN main console module 908, 918, 924 is a controller, and the interface module(s) 910, the data collection module 912, and the gateway modules 906, 916, 922 are slave modules with respect to the corresponding LAN main console module 908, 918, 924. Thus, the gateway modules 906, 916, 922 are slave modules with respect to two controllers. Moreover, FIG. 9 demonstrates that a particular LAN may take whatever configuration desired, with LAN 3 being the simplest available configuration.

Figure 10A:
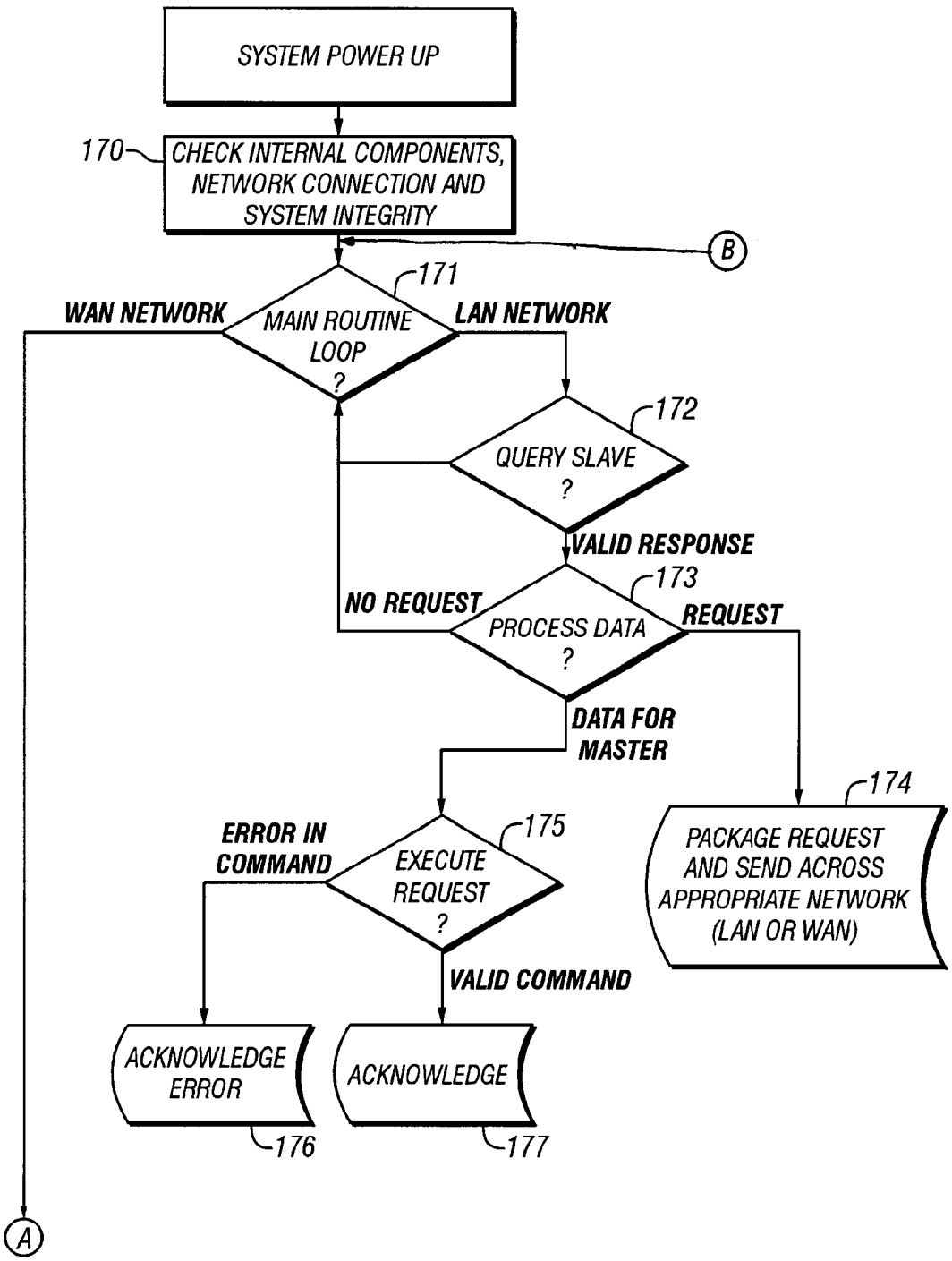
FIG. 10 is a flow chart illustrating the operation of a master module of the system of the present invention.
Figure 10B:
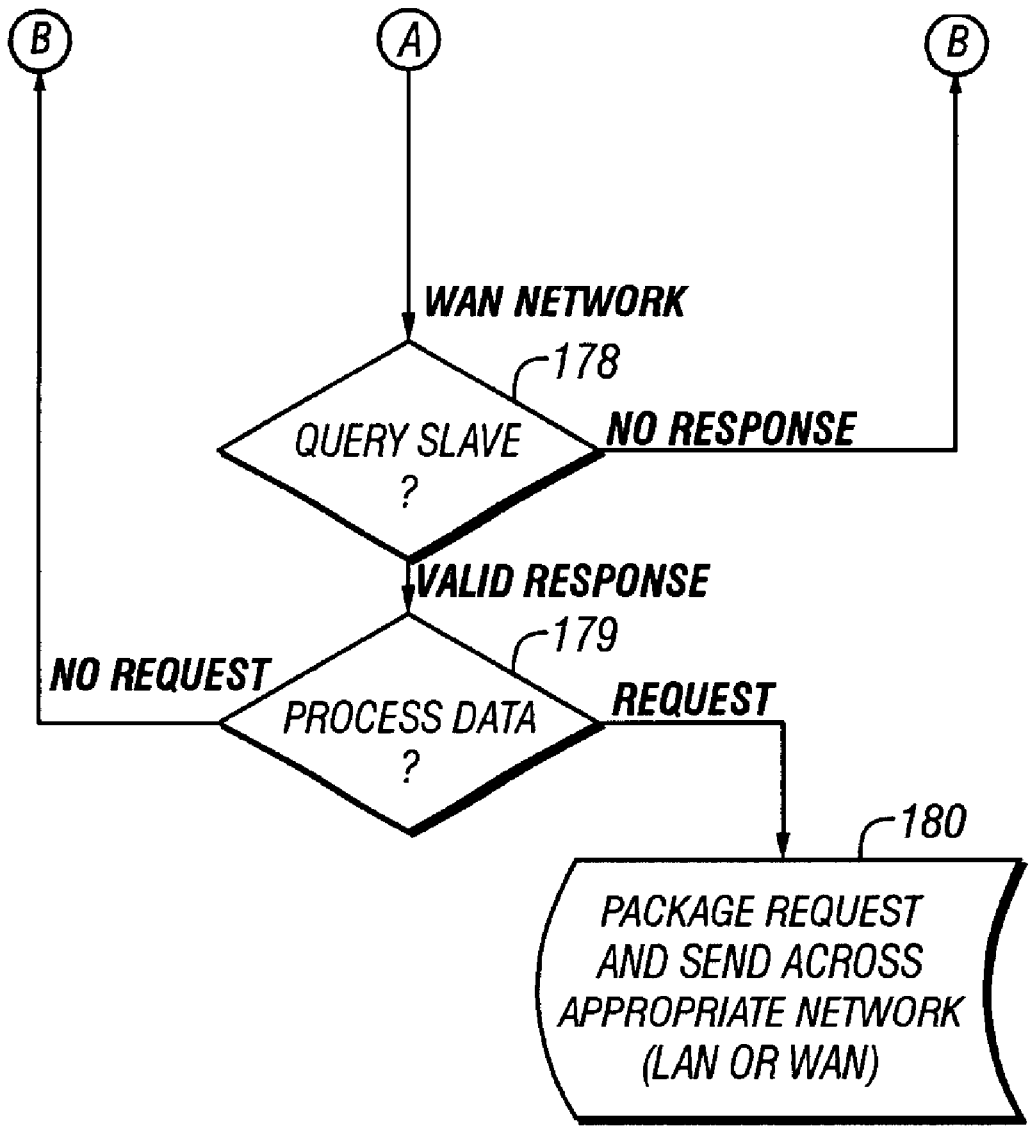

FIG. 10 is a flow chart illustrating the operation of the master module of the system of this embodiment. At block 170, upon system power up, the system performs diagnostic routines as are commonly known in the art. Generally, by way of example, the system will check internal components, connection to the network(s), and system integrity. At decision block 171, the master module identifies a module to be queried and determines that module's location based upon the system's WAN datastore. At decision block 172, upon determining that a module located on a LAN is to be queried, the master module queries that slave module. Because each module recognizes only certain commands, and because each module may receive commands intended for other modules, a command intended for other modules will be seen as an invalid command and ignored. Moreover, a module packages information before sending it to its destination, and the packaging includes an error correction scheme. Upon receiving a message, the receiving module unpacks the message and performs the same error correction scheme. If the results do not match the original message, then the module interprets the message as having been negatively effected during transfer, and so the message is considered invalid. Accordingly, if the slave module returns an invalid request, the processing returns to decision block 171 and begins again.

If the slave module returns a valid response, the system proceeds to decision block 173 where the master module processes the data sent by the slave module. If the slave module has requested data from the master module, then the system proceeds to block 174, where the master module packages the data related to the request and sends it across the appropriate network (i.e., either a LAN or WAN). If instead at decision block 173, the slave module transmits an execution request to the master module, the system proceeds to block 175 where such an execution request is executed. If the execution request sent to the master module represents an invalid command, the system proceeds to block 176 where the error is acknowledged by the master module. If instead the execution request represents a valid command, the system proceeds to block 177 where the valid command is acknowledged.

If at decision block 171 the master module determines that the slave module to be queried is on a WAN network (i.e. the gateways, 906, 916, 922), then the system proceeds to decision block 178 where that slave module is queried over the WAN network connection. If no response is received, the system returns to decision block 171 where the process begins again. If the slave module has produced a valid response, the system proceeds to block 179 where that response is processed. If that response represents no request of the master module, then the system returns to decision block 171 where the process begins again. If instead, the data sent by the slave module represents a valid request, then the system proceeds to block 180 where the master module packages the request and sends the request across the appropriate network.

Figure 11A:
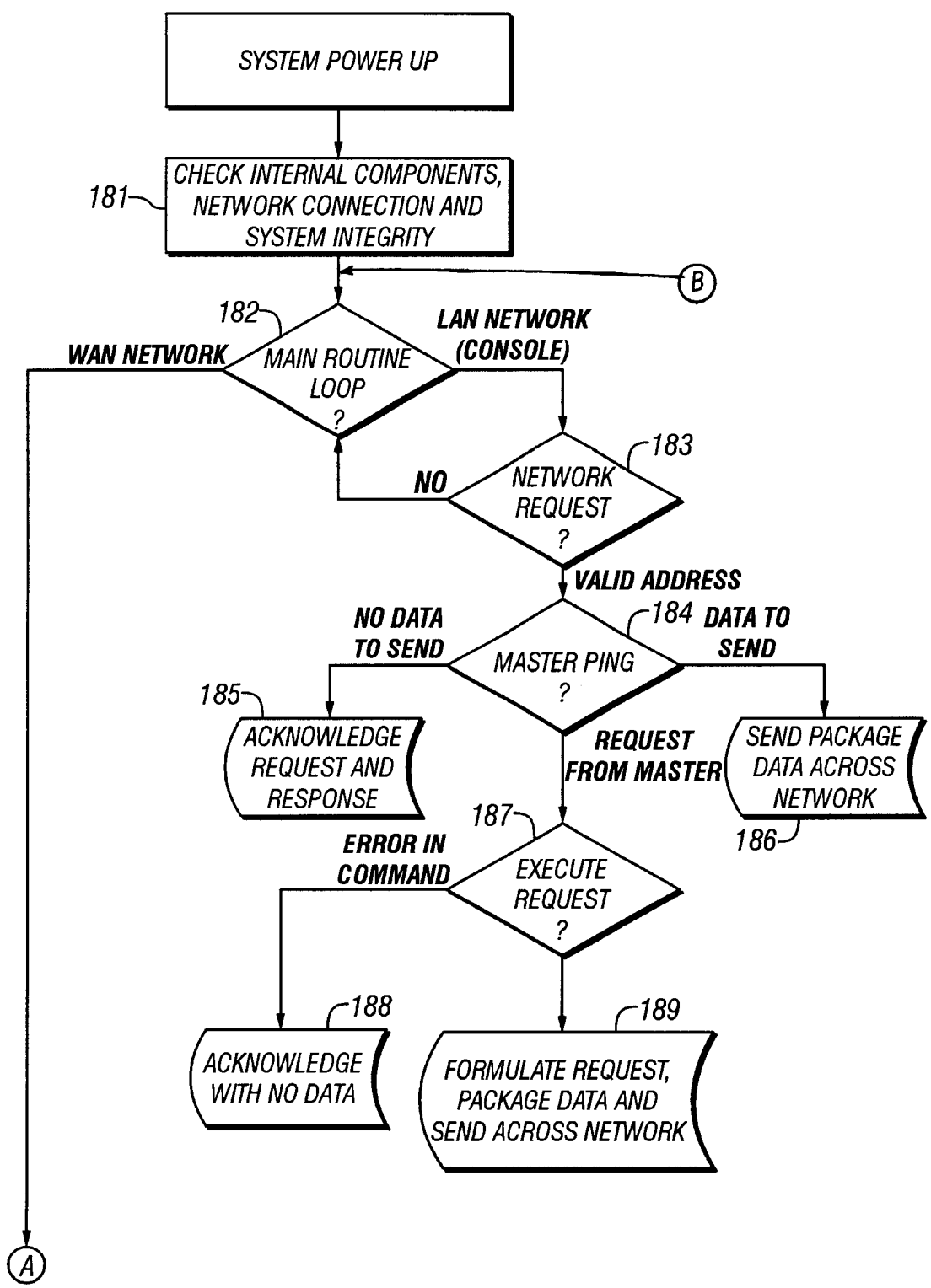
FIG. 11 is a flow chart illustrating the operation of a gateway module of the system of the present invention.
Figure 11B:
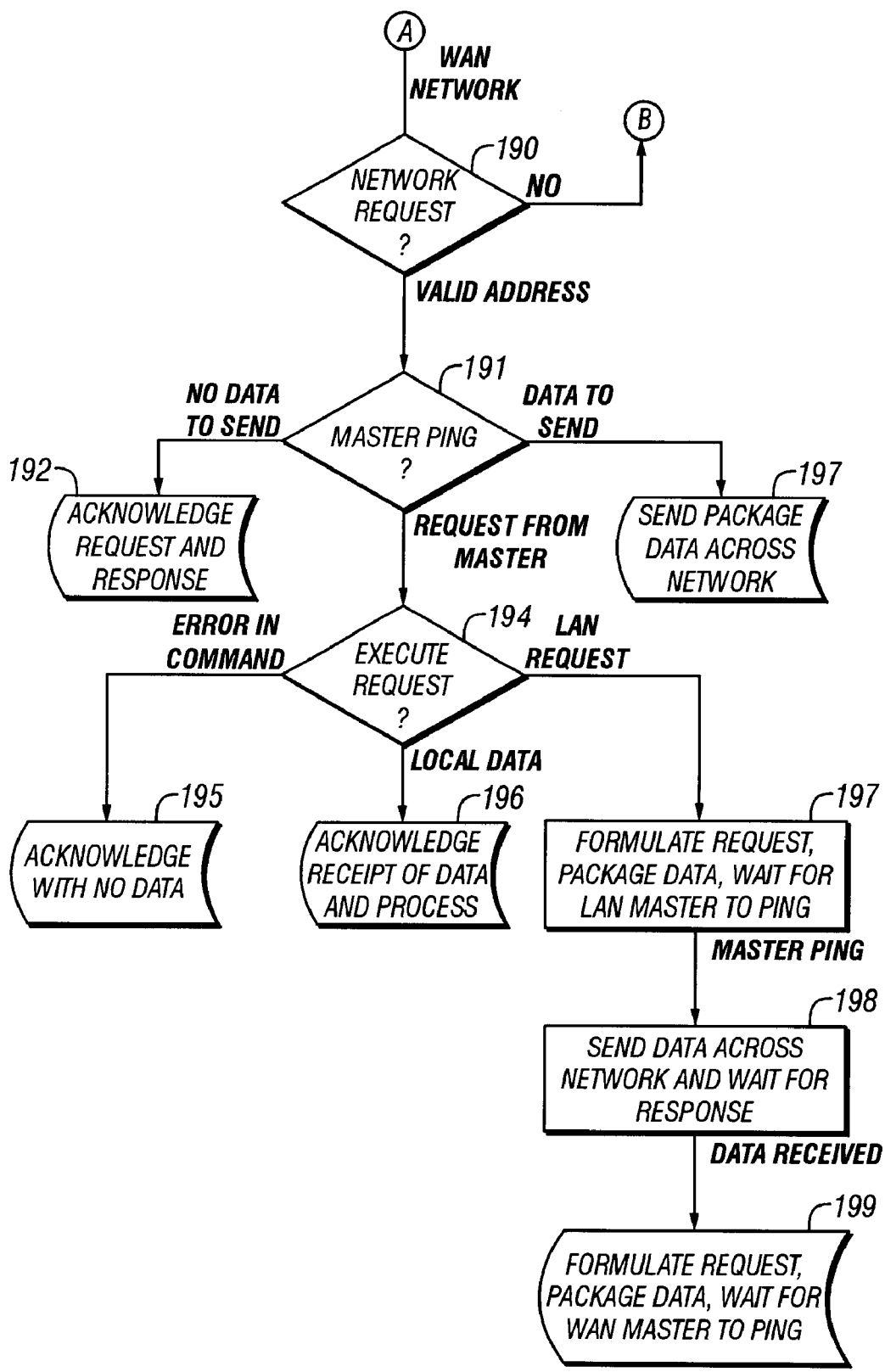

FIG. 11 is a flow chart illustrating the operation of the gateway module of the system of this embodiment. At block 181, upon system power up, the system performs diagnostic routines as discussed above. After power up, the system proceeds to decision block 182 where the system monitors for LAN or WAN activity. If there is activity on the LAN, the system proceeds to decision block 183 where the request is processed. If the system determines, based upon a read from the LAN datastore, that the address of the module to which the request is being made is invalid or is not an address at all, the system returns to decision block 182 where the process begins again. If instead, the system determines that the address is valid, the system proceeds to decision block 184 where the master module has successfully communicated with the slave module. If the system determines that there is no data to be sent, the system proceeds to block 185 where the request and response is acknowledged. If the system determines that there is data to be sent to the master module, the system proceeds to block 186 where that information is packaged and sent across the network to the master. Such data could, for example, be retrieved from a slave module buffer intended to store commands for retrieval at a later and more appropriate time. If the system determines instead that the master has made an execution request of the gateway module, then the system proceeds to decision block 187 where the execution request is executed. If the execution request made is invalid, the system proceeds to block 188 where such a state is acknowledged. If instead the system determines that the execution request is a valid one, the system proceeds to block 189 where the execution request is formulated, packaged, and sent across the network.

If at decision block 182 there is activity on a WAN, the system proceeds to decision block 190 where the request is processed. If the system determines that the address to which the request is being made is invalid, the system returns to decision block 182 where the process begins again. If instead the system determines that the address is valid, the system proceeds to block 191 where the master module has successfully communicated with the slave module. If the system determines that there is no data to be sent to the master module, the system proceeds to block 192 where the request and response are acknowledged. If instead the system determines that there is data to be sent to the master module, the system proceeds to block 193 where that information is packaged and sent to the master module across the WAN. If instead the system determines that the master is making an execution request, the system proceeds to decision block 194 where the execution request is executed. If the system determines that there is an error in the execution request, then the system proceeds to block 195 where that state is acknowledged. If the system determines that the execution request relates to data relating only to the requesting slave, then the system proceeds to block 196 where the execution request is processed internally. If instead the system determines that the execution request relates to modules on the LAN other than the requesting slave, then the system proceeds to block 197 where the execution request is formulated, packaged, and waits for a LAN main console module to communicate with its corresponding gateway module. When the gateway module receives a request from the LAN main console module, then the system proceeds to block 198 where the data is sent across the LAN, and the gateway module waits for a response. When the data is received, the system proceeds to block 199 where the request is formulated, the data is packaged, and the system waits for the WAN master module to communicate with the gateway module.

Figure 12A:
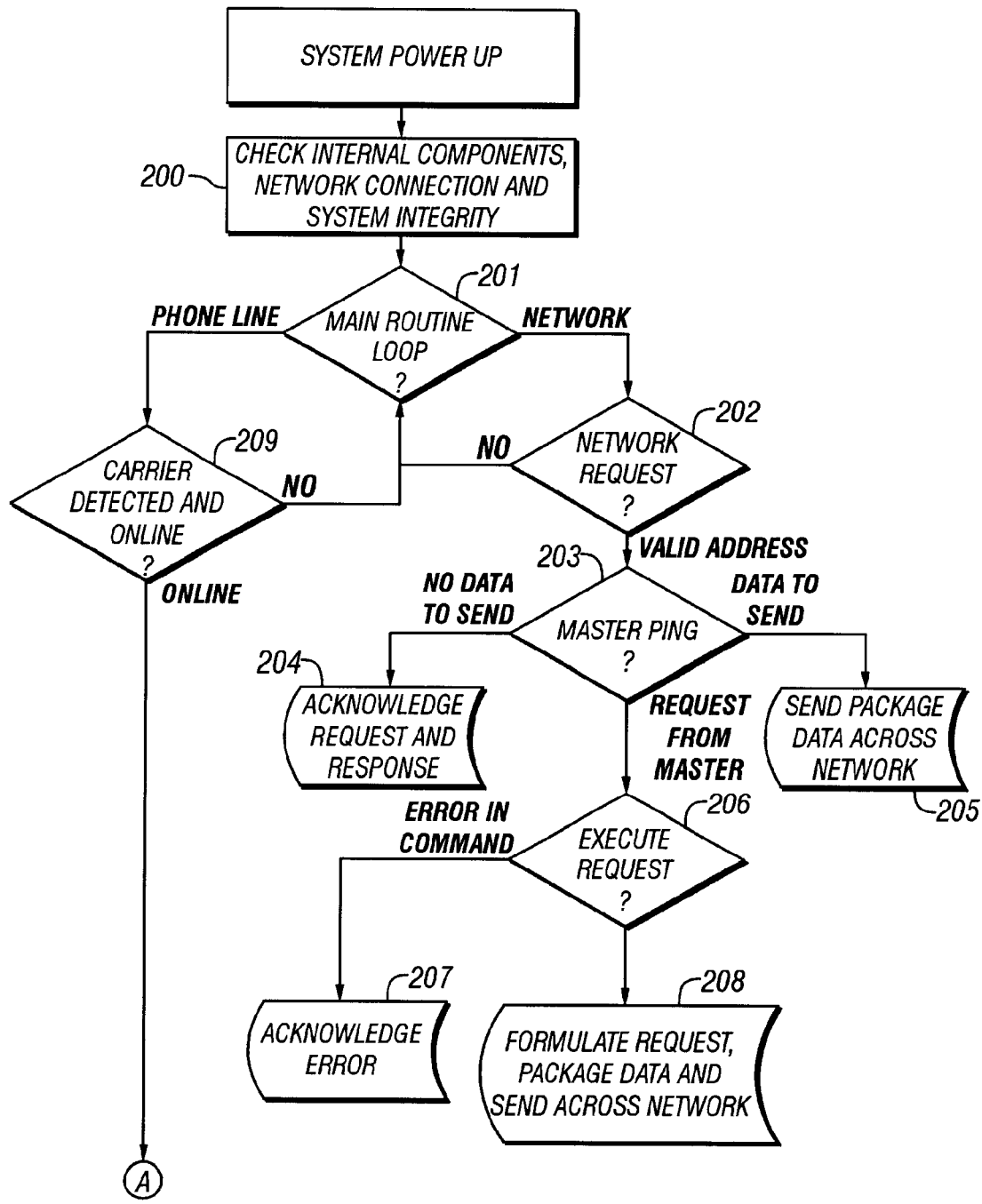
FIG. 12 is a flow chart illustrating the operation of a remote module of the system of the present invention.
Figure 12B:
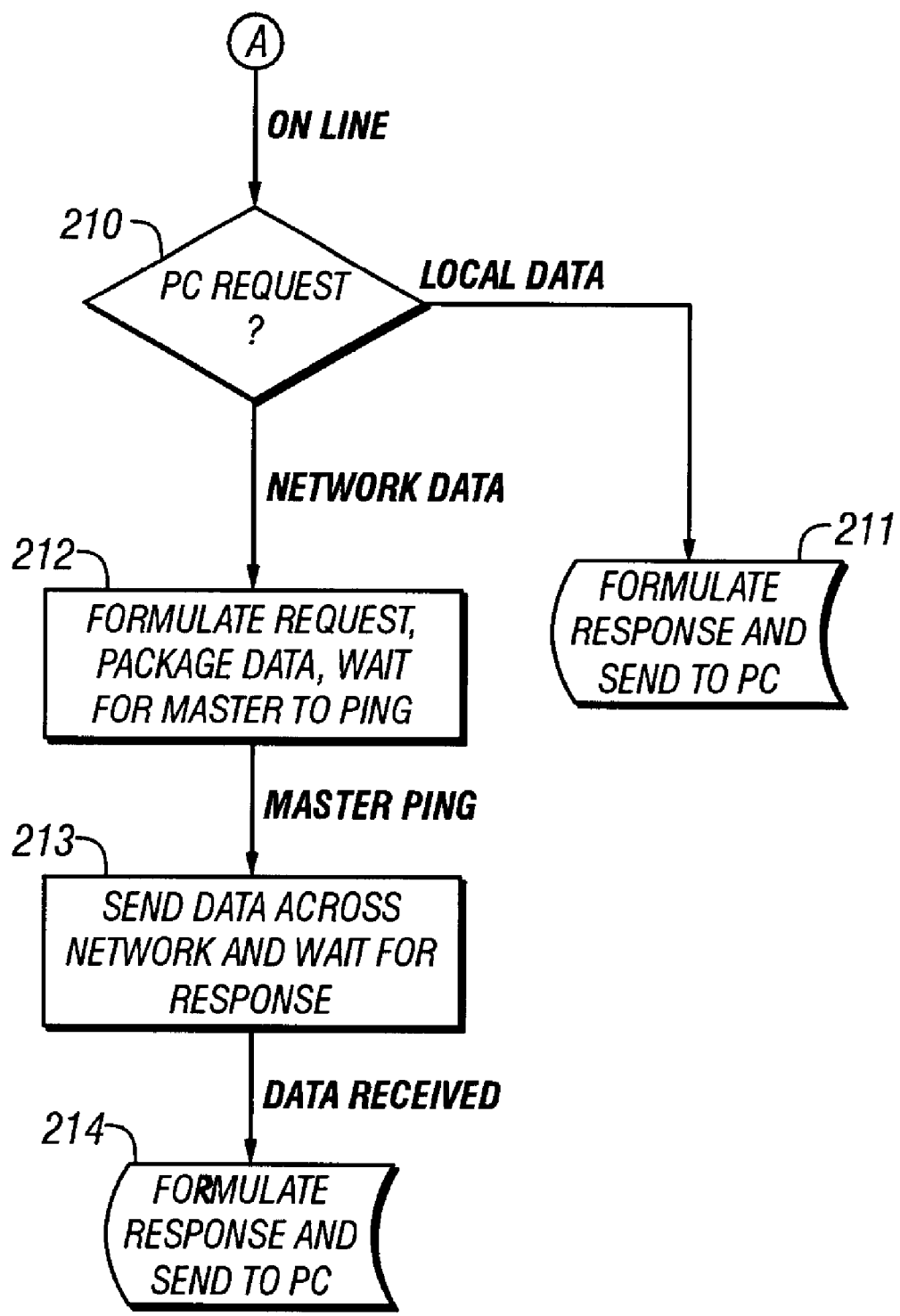

FIG. 12 is a flow chart illustrating the operation of the remote module of the system of this embodiment. At block 200, upon system power up, the system performs diagnostic routines as discussed above. The system then proceeds to decision block 201 where the remote module monitors for activity by way of a phone line connection or a network connection. If there is activity on the WAN, the system proceeds to decision block 202. If the system determines that the address to which the request is made is invalid (i.e., not an address on the LAN), then the system returns to decision block 201 and the process begins again. If instead the system determines that the address is valid, the system proceeds to decision block 203 where the request from the master module is processed. If there is a query command from the master module and no data is to be returned to the master module, then the system proceeds to block 204 where the request and response is acknowledged. If instead the system determines the buffer contains data that is to be sent to the master module, then the system proceeds to block 205 where that information is packaged and sent across the network. If the system determines that the master module has made an execution request of the remote module, then the system proceeds to decision block 206 where the execution request is executed. If the system determines that the execution request is in error, then the system proceeds to block 207 where such a state is acknowledged. If the system instead determines that the execution request is valid, then the system proceeds to block 208 where the execution request is formulated and the data is packaged and sent across the network.

If at decision block 201 there is activity on the phone line, then the system proceeds to decision block 209 where the system determines whether a valid phone carrier is detected and on line. If the system determines that such a carrier is not detected and on line, then the system returns to decision block 201 where the process begins again. If instead the system determines a valid phone line connection, then the system proceeds to decision block 210 where it waits for a request from a personal computer ("PC"). The system then determines at decision block 210 whether the data is to be processed locally or across the network. If the system determines that the data is to be processed locally, then the system proceeds to block 211 where a response is formulated and sent to the PC. If instead the system determines that the data relates to processing over the network then the system proceeds to block 212 where the request is formulated, the data is packaged, and the system awaits the master to communicate with the remote module. Upon receiving a communication from the master module, the system proceeds to block 213 where the data is sent across the network, and the system then waits for a response from the master module. When the master module acknowledges receipt of the data, the system proceeds to block 214 where the remote module formulates a response and sends that response to the PC.

Figure 13A:
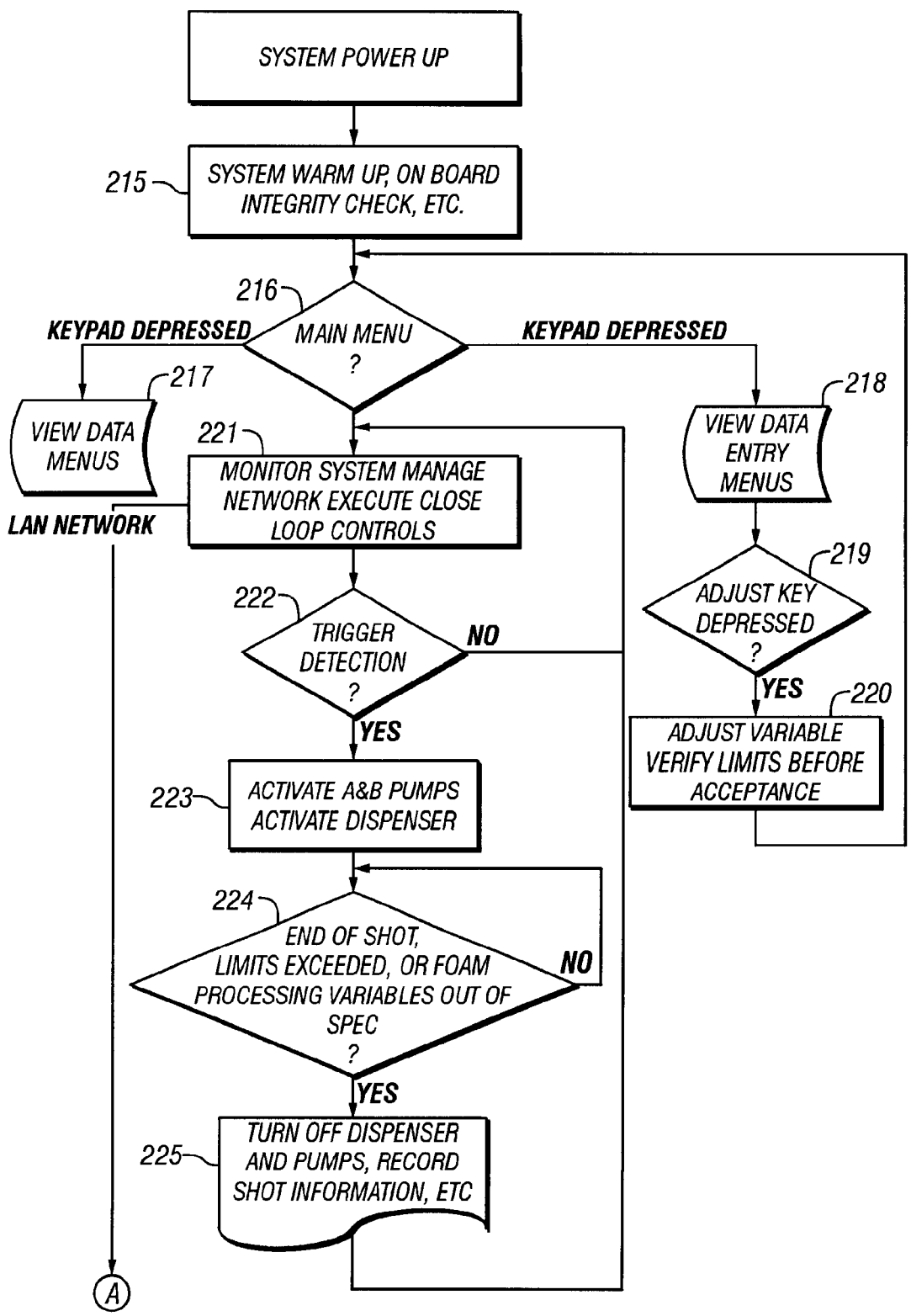
FIG. 13 is a flow chart illustrating the operation of a main console module of the system of the present invention.
Figure 13B:
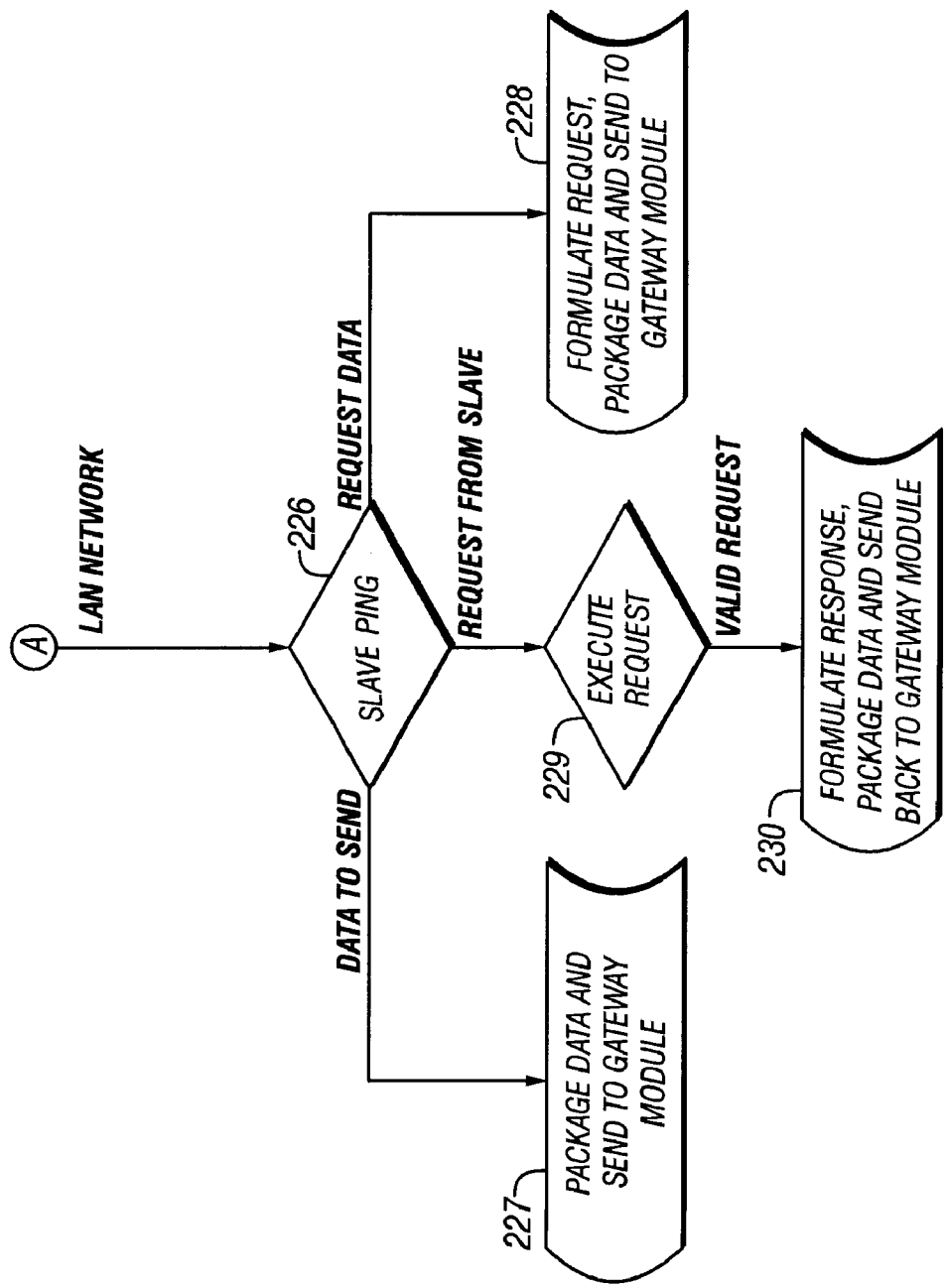

FIG. 13 is a flow chart illustrating the operation of the LAN main console module of the system of this embodiment. At block 215, upon system power up, the system performs diagnostic routines as discussed above. The system proceeds to decision block 216 where the main menu is presented to a user (not shown). The system monitors both system activity and input from the user. With regard to user input, the system detects whether particular keys are depressed on the console keypad. Upon depression of a designated key(s), the system proceeds to block 217 where menus are presented that permit the user to view system data. If instead an alternate key(s) is pressed, the system proceeds to block 218 where data entry menus are presented. The system then proceeds to decision block 219, where the adjust key is monitored. If the adjust key is depressed, then the system proceeds to block 220 where the system adjusts system data per the user's request subject to a verification of the acceptability of the requested change. That is, the system will provide checks to make sure that the user does not request unacceptable data values.

Returning to decision block 216, as discussed above, the system constantly monitors internal activity as well. The process continues to block 221 where the system is monitored, the network is managed, and closed loop controls are executed. The system then proceeds to decision block 222, where the trigger for the dispensing unit is monitored. If the system determines that the trigger has not been pulled, then the system returns to decision block 221. If instead the system determines that the trigger has been pulled, then the system proceeds to block 223 where the A and B pumps and the dispenser are activated. The system then proceeds to decision block 224 where the system determines whether an end of shot indicator has been received, the acceptable limits have been exceeded, or the foam processing variable are not in conformance with specifications. If the system determines that none of these conditions are met, then the system continues with the shot activated with respect to block 223. If instead the system determines that one or more of those conditions are met, then the system proceeds to block 225 where it turns off the dispenser and pumps and then records all data relevant to the shot. Such data may include, for example, the shot's location, success or failure, date, time, duration, amount of each chemical dispensed, temperature of each chemical dispensed, pressure of each chemical dispensed, etc. The system then returns to block 221 where the internal monitoring process begins again.

One or more system timers, in the form of clocks 145, 146 are also activated upon a signal that senses the actuation of the gun trigger. One of these timers records, for each shot, a date and time in calendar format, i.e., month, day, and year format along with a 24 hour clock format. Another of these clocks will measure the total time that the trigger is actuated so as to permit the determination of the duration of the shot. This data is cumulatively collected and recorded for each dispensing unit of each LAN under control of the WAN, and is recorded in the LAN datastore 142 or in a datastore of the WAN. In this manner, the system can maintain a record of the duration of shots of each operator at each dispensing unit to determine the efficiency of system operators. The duration of the shots also permits the system to determine what the volume is of the remaining foam components for that particular dispensing unit, so that if necessary, the system may generate "alarm" notices as to low or falling capacity or to generate "maintenance needed" signals or alarms.

Also at block 221, the system monitors slave modules by way of a LAN connection. The system proceeds to decision block 226 where a slave module receives a request from the LAN main console module. If the system determines that there is data to be sent to the gateway module, then the system packages that data and sends it to the gateway module at block 227. If instead the system determines that a request is to be made of the gateway module, then the system proceeds to block 228 where the request is formulated and the data is packaged and sent to the gateway module. If instead the system determines at decision block 226 that the slave is to make a request of the gateway module, then the system proceeds to decision block 229 where the request is executed. If the system determines that that request is valid, then the system proceeds to block 230 where a response is formulated and the appropriate data is packaged and sent back to the gateway module.

Figure 14:
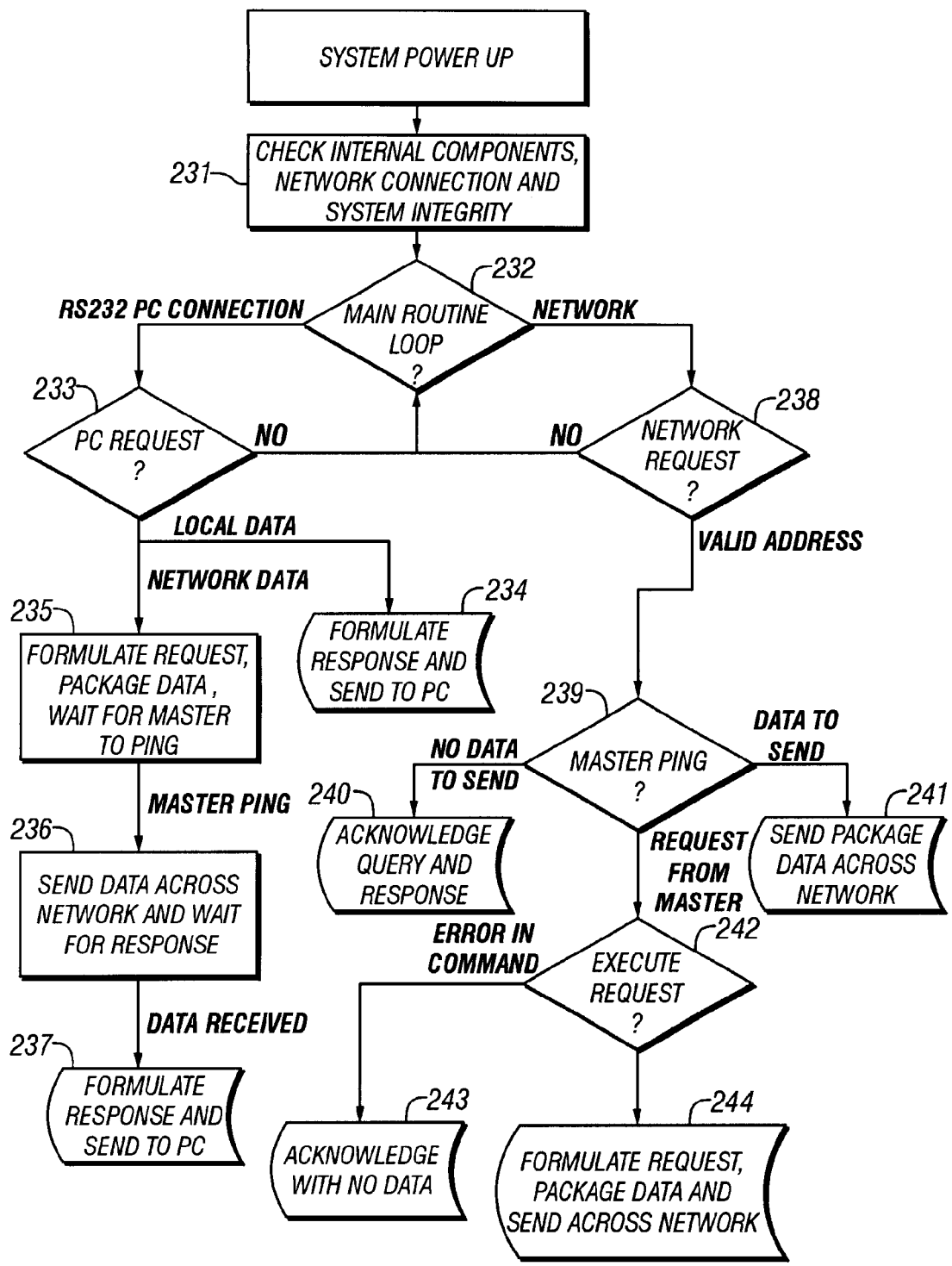
FIG. 14 is a flow chart illustrating the operation of a personal computer module of the system of the present invention.

FIG. 14 is a flow chart illustrating the operation of the PC module of the system of this embodiment. At block 231, upon system power up, the system performs diagnostic routines as discussed above. The system proceeds then to decision block 232 where the system determines whether a request is to be made by way of an RS232 PC connection or a network connection. If the system determines that a PC connection is to be used, then the system proceeds to decision block 233 where the system determines whether a request is actually made. If there is no request, the system returns to decision block 232 where the process begins again. If instead the system determines that a request has been made by way of the PC, then the system then determines whether the processing of data will occur locally or by way of the network. If locally, then the system proceeds to block 234 where the response is formulated and sent to the PC. If instead the system determines that the request is related to the network, then the system proceeds to block 235 where the request is formulated, the data is packaged and the PC awaits a request from the master module. When the master module makes a request of the PC, then the system proceeds to block 236 where the data is sent across the network and a response is awaited from the master module. When the master module receives the data, then the system proceeds to block 237 where the master module formulates a response and sends it to the PC.

If at decision block 232 the system determines that a network connection is to be used then the system proceeds to decision block 238 where the system determines whether a network request is made. If no such request is made or if the request is made to an address that is determined to be invalid, the system returns to decision block 232 where the process begins again. If instead a request is made to a valid address, then the system proceeds to decision block 239 where the master module communicates a request to the PC module. If the system determines that no data is to be sent to the master module, then the system proceeds to block 240 where such a state is acknowledged. If instead the system determines the data is to be sent to the master module, then the system proceeds to block 241 where that information is packaged and sent across the network. If instead the system determines that the master module makes an execution request to the PC module, then the system proceeds to decision block 242 where the execution request is executed. If the system determines that the execution request is in error, then the system proceeds to block 243 where the error is acknowledged and no data is sent. If instead the system determines that the execution request is valid, then the system proceeds to block 244 where the execution request is formulated, and the information is packaged and sent across the network.

Figure 15A:
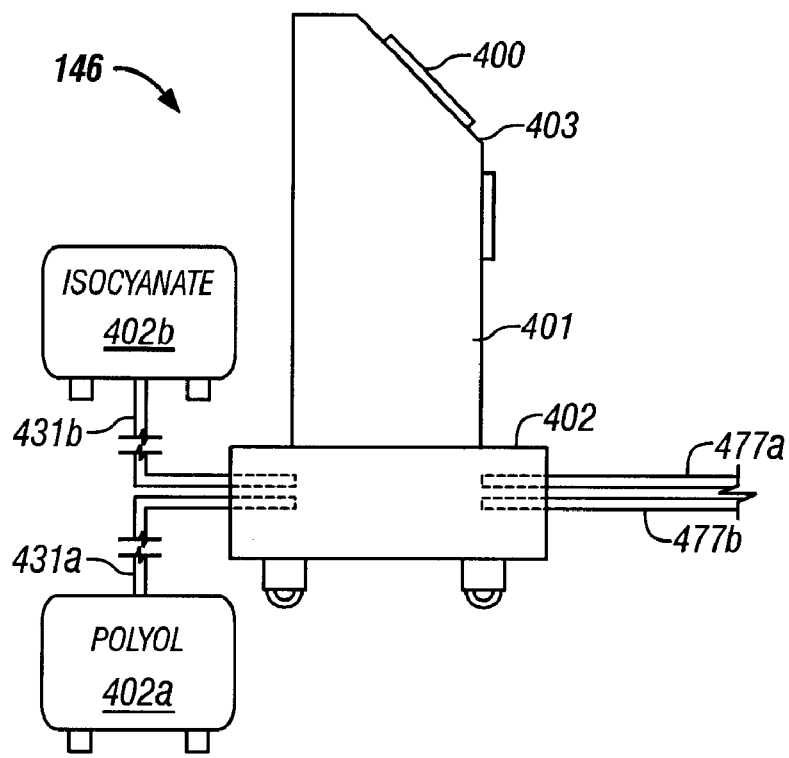
FIG. 15A is an side elevational view, of the dispensing system control console of FIG. 8.
Figure 15B:
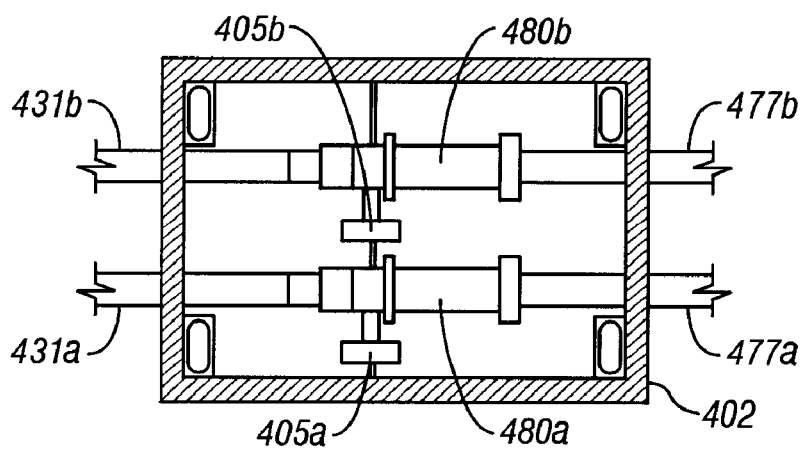
FIG. 15B is a cross-sectional view of the control console base of FIG. 15A, taken along lines B-B thereof; and, FIG. 15C is a plan view of the console visual display of FIG. 15A.
Figure 15C:
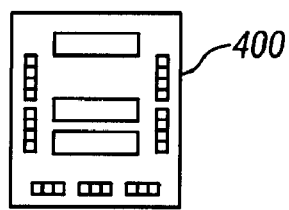

The system of the invention may also be incorporated into a roll away assembly using the console 146 illustrated in FIG. 8. FIG. 15A illustrates one manner of placement of the system components and it can be seen that the console 146 includes a wheeled base 402 with a hollow cabinet 401 extending upwardly therefrom. A display panel 400 is provided at the top of the cabinet on the support 403 thereof. In this embodiment, the two A and B foam component pumps 480*a*, 480*b* are mounted within the wheeled base 402 and have their sensor modules 405*a*, 405*b* mounted closely thereto and in communication therewith. Supply hoses 477*a*, 477*b* are provided to complete an output path from the supply pumps 480*a*, 480*b* to the dispensing unit 70. The hoses 477*a*, 477*b* may include heaters, such as thermistors disposed within the hose passages in order to heat the A and B components as they travel from the supply pumps 480*a*, 480*b* to the dispensing unit 70. The temperature readout of the thermistors or other temperature-determining means may be present on the display screen in either a dedicated output or as part of a varying and selectable output accessed by pressing a particular function key on the display panel. Other circuitry output such as time and flow rate(s) are also displayed on the display panel (FIG. 15C) where they are readable by either the console operator or gun operator (or by the operator acting at both the gun and console. With a system such as this, the dispensing operator may read the system outputs and make adjustments as necessary, or a separate, console operator monitoring the outputs may perform such tasks. The wheeled console 146 may include small foam component supply sources, such as tanks that are located within the cabinet 401, or it may receive a direct feed of foam components from pressurized tanks 402*a*, 402*b* via additional supply hoses 431*a*, 431*b* or a supply manifold (not shown). FIG. 15B provides a view from underneath the wheeled base 402 showing the connection of the supply hoses 431*a*, 431*b*, 477*a*, 477*b* to the supply pumps 480*a*, 480*b* as well as the mounting of the sensor modules 405*a*, 405*b* in close proximity to their respective supply pumps 480*a*, 480*b*.

Those of ordinary skill in the art will recognize that this embodiment makes advances in the area of foam dispensing systems. This embodiment provides a system for an automated monitoring and diagnostic system for use with foam dispensing systems that permits remote control of the dispensing of foam. Although the systems have been described largely in the context of a foam cushion filling and article packing environment, it will be understood that this has been solely for the purpose of explanation and is not to be considered as limiting, and that the systems of the invention may be used in other industries, such as in the production of rigid foam panels, where panel molds by be advanced to a dispensing station. The molds may be on a conveyor or coupled to a controller of the system so that the flow can be interrupted during system modifications, or in the event of low or no foam conditions. The amount of foam per panel may be monitored in instances such as this so that the system operator may determine the optimum amount of foam needed for each panel, and the controller may then be used to restrict to operation of the dispensing unit so that the optimum amount is not exceeded and foam components are not wasted. Similar applications of the systems of this embodiment may be applied to operations that apply foam as thermal or sound insulation.

While the preferred embodiment of the invention have been shown and described, it will be apparent to those skilled in the art that changes and modifications may be made therein without departing from the spirit of the invention, the scope of which is defined by the appended claims. For example, this embodiment may be implemented using other forms of sensors as are commonly known in the art. Moreover, the system could employ a different type of remote network such as satellite link. It is therefore contemplated that this embodiment cover any and all modifications, variations, or equivalents that fall within the sphere and scope of the basic underlying principles claimed herein.

What is claimed is:

1. A dispensing monitoring apparatus which dispenses a polyurethane foam formed as the reaction product from the mixing together of a plurality of streams of reactive foam components comprising:

a power supply;

a processor;

a memory operatively coupled to the processor;

motor control circuitry operatively coupled to the processor;

at least two supply sources of reactive foam components;
a dispensing unit for dispensing the polyurethane foam, the dispensing unit having a plurality of inputs for receiving respective supply streams of the plurality of reactive foam components, the dispensing unit further including a trigger that is selectively actuable by a user to dispense a preselected amount of the reactive foam components mixed together to form the polyurethane foam;
  a plurality of foam component supply pumps for delivering the plurality of reactive foam component supply streams from the supply sources to said dispensing unit;
  a pair of supply hoses interconnecting outputs of the plurality of pumps to the plurality of inputs of the dispensing unit;
a datastore for storing at least one of system parameters, shot data, and node location data;
at least one sensor operatively coupled to the processor for gathering shot data and transmitting the shot data to the processor;
a first clock operatively coupled to the trigger for recording a time and date of the dispensing;
a second clock operatively coupled to the trigger for recording a duration of the at least one shot; and
a user interface for receiving from the processor and displaying data generated by at least one of the first clock, the second clock, and the at least one sensor comprising:
  a visual display; and
  a user-interactive data entry device.

2. The apparatus of claim 1 wherein the user-interactive data entry device is a console keypad.

3. The apparatus of claim 1 wherein the at least one sensor is at least one of a revolutions-per-minute sensor, a pressure sensor and a temperature sensor.

4. The apparatus of claim 1 wherein the at least two pumps are of the gerotor type.

5. The apparatus of claim 1 wherein the system parameters include limits to at least one of a duration of the at least one shot, amounts of the at least two chemical components dispensed during the at least one shot, temperatures of the at least two chemical components dispensed during the at least one shot, and pressures of the at least two chemical components dispensed during the at least one shot.

6. The apparatus of claim 1 wherein the shot data includes at least one of a location of the at least one shot, a success indicator of the at least one shot, amounts of the at least two chemical components dispensed during the at least one shot, temperatures of the at least two chemical components dispensed during the at least one shot, and pressures of the at least two chemical components dispensed during the at least one shot.

7. The apparatus of claim 1 wherein the node location data includes a network address of at least one node and a textual representation of the location of the at least one node.

8. The apparatus of claim 1 wherein the shot data is formatted to compose a real time inventory.

9. A dispensing system including a local area network comprising:
a foam dispensing monitoring apparatus which dispenses a polyurethane foam formed as the reaction product from the mixing together of a plurality of streams of reactive foam components comprising:
  a power supply;
  a processor;
  a memory operatively coupled to the processor;
  motor control circuitry operatively coupled to the processor;
  at least two supply sources of reactive foam components;
  a dispensing unit for dispensing the polyurethane foam, the dispensing unit having a plurality of inputs for receiving respective supply streams of the plurality of reactive foam components, the dispensing unit further including a trigger that is selectively actuable by a user to dispense a preselected amount of the reactive foam components mixed together to form the polyurethane foam;
  a plurality of foam component supply pumps for delivering the plurality of reactive foam component supply streams from the supply sources to said dispensing unit;
  a pair of supply hoses interconnecting outputs of the plurality of pumps to the plurality of inputs of the dispensing unit;
  a datastore for storing at least one of system parameters, shot data, and node location data;
  at least one sensor operatively coupled to the processor for gathering the shot data and transmitting the shot data to the processor;
  a first clock operatively coupled to the trigger for recording a time and date of the dispensing;
  a second clock operatively coupled to the trigger for recording a duration of the at least one shot; and
  a user interface for receiving from the processor and displaying data generated by at least one of the first clock, the second clock, and the at least one sensor comprising:
    a visual display; and
    a user-interactive data entry device; and
a gateway apparatus comprising:
  a first data communication link operatively coupling the gateway apparatus to the foam dispensing monitoring apparatus; and
  a second data communication link for operatively coupling the gateway apparatus to a master controller apparatus.

10. The foam dispensing local area network of claim 9 further comprising:
an interface apparatus operatively coupled to the foam dispensing monitoring apparatus and operatively coupled to external equipment,
  wherein the interface apparatus facilitates bi-directional communication between the foam dispensing monitoring apparatus and the external equipment.

11. The foam dispensing local area network of claim 10 wherein the interface module is operatively coupled to a plurality of external equipment.

12. The foam dispensing local area network of claim 10 wherein the external equipment is at least one of sensors dedicated to the local area network.

13. The foam dispensing local area network of claim 10 wherein the external equipment is a conveyor apparatus.

14. The foam dispensing local area network of claim 9 further comprising:
a data collection apparatus operatively coupled to the foam dispensing monitoring apparatus and operatively coupled to external equipment,
  wherein the data collection apparatus facilitates unidirectional communication between the foam dispensing monitoring apparatus and the external equipment.

15. The foam dispensing local area network of claim 14 wherein the data collection apparatus is operatively coupled to a plurality of external equipment.

16. The foam dispensing local area network of claim 14 wherein the external equipment is a bar-code reader.

17. The foam dispensing local area network of claim 16 wherein the bar-code reader is capable of reading at least one of a one-dimensional barcode format and a two-dimensional barcode format.

18. The foam dispensing local area network of claim 9 wherein the shot data is formatted to compose a real time inventory.

19. A dispensing system including a wide area network comprising:
   at least one foam dispensing monitoring apparatus which dispenses a polyurethane foam formed as the reaction product from the mixing together of a plurality of streams of reactive foam components comprising:
      a power supply;
      a processor;
      a memory operatively coupled to the processor;
      motor control circuitry operatively coupled to the processor;
      at least two supply sources of reactive foam components;
      a dispensing unit for dispensing the polyurethane foam, the dispensing unit having a plurality of inputs for receiving respective supply streams of the plurality of reactive foam components, the dispensing unit further including a trigger that is selectively actuable by a user to dispense a preselected amount of the reactive foam components mixed together to form the polyurethane foam;
      a plurality of foam component supply pumps for delivering the plurality of reactive foam component supply streams from the supply sources to said dispensing unit;
      a pair of supply hoses interconnecting outputs of the plurality of pumps to the plurality of inputs of the dispensing unit;
      a datastore for storing at least one of system parameters, shot data, and node location data;
      at least one sensor operatively coupled to the processor for gathering the shot data and transmitting the shot data to the processor;
      a first clock operatively coupled to the trigger for recording a time and date of the dispensing;
      a second clock operatively coupled to the trigger for recording a duration of the at least one shot; and
      a user interface for receiving from the processor and displaying data generated by at least one of the first clock, the second clock, and the at least one sensor comprising:
         a visual display; and
         a user-interactive data entry device;
   a master controller apparatus comprising:
      a master processor;
      a master memory operatively coupled to the master processor; and
      a master datastore for storing and identifying locations of nodes on the wide area network; and
   the at least one gateway apparatus comprising:
      a first data communication link operatively coupling the at least one gateway apparatus to the at least one foam dispensing monitoring apparatus; and
      a second data communication link operatively coupling the at least one gateway apparatus to the master controller apparatus.

20. The foam dispensing wide area network of claim 19 further comprising:
   a remote communication apparatus operatively coupled to the master controller apparatus for facilitating communication to a remote gateway apparatus.

21. The foam dispensing wide area network of claim 20 herein the remote communication apparatus facilitates at least one of remote monitoring of and remote control over operations of the foam dispensing wide area network.

22. The foam dispensing wide area network of claim 19 further comprising:
   a personal computer operatively coupled to the master controller apparatus and operatively coupled to external equipment.

23. The foam dispensing wide area network of claim 19 wherein the shot data is formatted to compose a real time inventory.

24. A dispensing system including a wide area network comprising:
   a foam dispensing monitoring apparatus which dispenses a polyurethane foam formed as the reaction product from the mixing together of a plurality of streams of reactive foam components comprising:
      a power supply;
      a processor;
      a memory operatively coupled to the processor;
      motor control circuitry operatively coupled to the processor;
      at least two supply sources of reactive foam components;
      a dispensing unit for dispensing the polyurethane foam, the dispensing unit having a plurality of inputs for receiving respective supply streams of the plurality of reactive foam components, the dispensing unit further including a trigger that is selectively actuable by a user to dispense a preselected amount of the reactive foam components mixed together to form the polyurethane foam;
      a plurality of foam component supply pumps for delivering the plurality of reactive foam component supply streams from the supply sources to said dispensing unit;
      a pair of supply hoses interconnecting outputs of the plurality of pumps to the plurality of inputs of the dispensing unit;
      a datastore for storing at least one of system parameters, shot data, and node location data;
      at least one sensor operatively coupled to the processor for gathering the shot data and transmitting the shot data to the processor;
      a first clock operatively coupled to the trigger for recording a time and date of the dispensing;
      a second clock operatively coupled to the trigger for recording a duration of the at least one shot; and
      a user interface for receiving from the processor and displaying data generated by at least one of the first clock, the second clock, and the at least one sensor comprising:
         a visual display; and
         a user-interactive data entry device;
   a master controller apparatus comprising:
      a processor;
      a memory operatively coupled to the processor; and
      a datastore for storing and identifying locations of nodes on the wide area network;

a gateway apparatus comprising:
   a first data communication link operatively coupling the gateway apparatus to the foam dispensing monitoring apparatus; and
   a second data communication link operatively coupling the gateway apparatus to the master controller apparatus;
an interface apparatus operatively coupled to the foam dispensing monitoring apparatus and operatively coupled to interfaced external equipment,
   wherein the interface apparatus facilitates bi-directional communication between the foam dispensing monitoring apparatus and the interfaced external equipment;
a data collection apparatus operatively coupled to the foam dispensing monitoring apparatus and operatively coupled to data collection external equipment,
   wherein the data collection apparatus facilitates unidirectional communication between the foam dispensing monitoring apparatus and the data collection external equipment;
a remote communication apparatus operatively coupled to the master controller apparatus for facilitating communication to a remote gateway apparatus; and
a personal computer operatively coupled to the master controller apparatus and operatively coupled to computer-driven external equipment.

* * * * *